US009130914B2

(12) United States Patent
Miura

(10) Patent No.: US 9,130,914 B2
(45) Date of Patent: Sep. 8, 2015

(54) COMMUNICATION CONTROL SYSTEM, SERVER DEVICE, COMMUNICATION DEVICE, AND COMMUNICATION CONTROL METHOD

(75) Inventor: Kouji Miura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 515 days.

(21) Appl. No.: 13/511,437

(22) PCT Filed: Sep. 26, 2011

(86) PCT No.: PCT/JP2011/005380
§ 371 (c)(1),
(2), (4) Date: May 23, 2012

(87) PCT Pub. No.: WO2012/042816
PCT Pub. Date: Apr. 5, 2012

(65) Prior Publication Data
US 2012/0284413 A1    Nov. 8, 2012

(30) Foreign Application Priority Data

Sep. 30, 2010   (JP) ................................. 2010-222950

(51) Int. Cl.
*H04L 29/06* (2006.01)
*G06F 21/44* (2013.01)

(52) U.S. Cl.
CPC ............ *H04L 63/062* (2013.01); *G06F 21/445* (2013.01); *H04L 63/0869* (2013.01); *G06F 2221/0704* (2013.01); *G06F 2221/2115* (2013.01); *G06F 2221/2129* (2013.01)

(58) Field of Classification Search
CPC .......... G06F 21/445; G06F 2221/0704; G06F 2221/2115; G06F 2221/2129; H04L 63/062; H04L 63/0869

USPC .......................................................... 709/227
See application file for complete search history.

(56) References Cited

U.S. PATENT DOCUMENTS 8,059,573 B2    11/2011  Julian et al.
8,271,662 B1 *  9/2012   Gossweiler et al. .......... 709/227
(Continued)

FOREIGN PATENT DOCUMENTS

CN      101663890       3/2010
CN      101809947       8/2010
(Continued)

OTHER PUBLICATIONS

International Search Report issued Oct. 25, 2011 in International (PCT) Application No. PCT/JP2011/005380.
(Continued)

*Primary Examiner* — Michael C Lai
(74) *Attorney, Agent, or Firm* — Wenderoth, Lind & Ponack, L.L.P.

(57) ABSTRACT

A pairing server (313) includes: a first generation unit (317a) which generates a first pairing identifier when the pairing server receives a first request from a receiving terminal (307); a first transmitting unit (316a) which transmits the first pairing identifier to the receiving terminal (307) in response to the first request; a second generation unit (317b) which generates a second pairing identifier when the pairing server receives from a transmitting terminal (301) a second request which includes the first pairing identifier; a second transmitting unit (316b) which transmits the second pairing identifier to the receiving terminal (307) or the transmitting terminal (301) in response to the second request; and a pairing unit (315e) which pairs the receiving terminal (307) and the transmitting terminal (301) when the pairing server receives a third request which includes the first pairing identifier and the second pairing identifier.

15 Claims, 46 Drawing Sheets

(56) References Cited

U.S. PATENT DOCUMENTS

| | | | |
|---|---|---|---|
| 8,276,073 B2* | 9/2012 | Okamoto et al. | 715/718 |
| 8,634,775 B2* | 1/2014 | Oshiba | 455/41.2 |
| 2008/0016537 A1* | 1/2008 | Little et al. | 725/81 |
| 2008/0090524 A1* | 4/2008 | Lee et al. | 455/41.2 |
| 2009/0034591 A1* | 2/2009 | Julian et al. | 375/220 |
| 2010/0030868 A1 | 2/2010 | Okamoto et al. | |
| 2010/0058192 A1 | 3/2010 | Okamoto et al. | |
| 2010/0107208 A1 | 4/2010 | Okamoto et al. | |
| 2010/0154020 A1 | 6/2010 | Okamoto et al. | |
| 2010/0313231 A1 | 12/2010 | Okamoto et al. | |
| 2011/0244829 A1* | 10/2011 | Kase | 455/411 |
| 2011/0281523 A1 | 11/2011 | Oshiba | |

FOREIGN PATENT DOCUMENTS

| | | |
|---|---|---|
| EP | 1 881 663 | 1/2008 |
| JP | 2006-352319 | 12/2006 |
| JP | 2008-28498 | 2/2008 |
| JP | 2008-47022 | 2/2008 |
| JP | 2009-230649 | 10/2009 |
| WO | 2008/093781 | 8/2008 |
| WO | 2009/018252 | 2/2009 |
| WO | 2010/067605 | 6/2010 |

OTHER PUBLICATIONS

Office Action issued Dec. 31, 2014 in corresponding Chinese Application No. 201180004712.5 (with partial English translation).

* cited by examiner

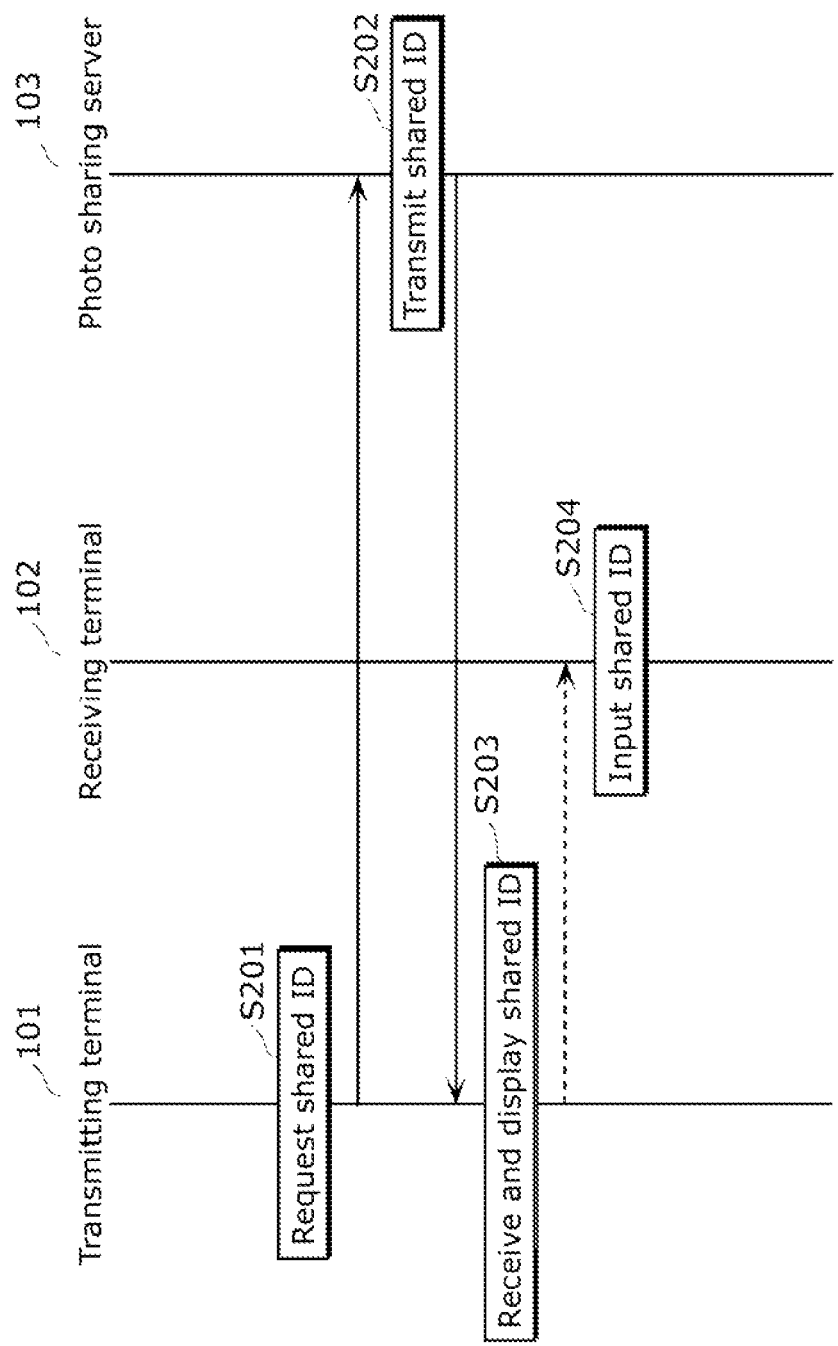

FIG. 4

| Management ID | Communication phase | First pairing value | Second pairing value |
|---|---|---|---|
| 00000001 | 1 | 123456789 | 3 |

| Management ID | Communication phase | First pairing value | Second pairing value |
|---|---|---|---|
| 00000001 | 1 | 123456789 | 3 |

| Receiving terminal ID | Transmitting terminal ID | Communication phase | First pairing value | Second pairing value |
|---|---|---|---|---|
| 112233EEFF | 12345ABCDE | 1 | 123456789 | |
| 223344DDFF | | 2 | 32987 | 49276 |

| Receiving terminal ID | Transmitting terminal ID | Communication phase | First pairing value | Second pairing value |
|---|---|---|---|---|
| 112233EEFF | | 1 | 123456789 | |

| Management ID | Communication phase | First pairing value | Second pairing value |
|---|---|---|---|
| 00000001 | 1 | 123456789 | |

| Management ID | Communication phase | First pairing value | Second pairing value |
|---|---|---|---|
| 00000001 | 1 | 123456789 | |

FIG. 18

| Receiving ID | Transmitting ID | Communication phase | First pairing value | Second pairing value |
|---|---|---|---|---|
| 112233EEFF | 12345ABCDE | 2 | 123456789 | 3 |

| Management ID | Communication phase | First pairing value | Second pairing value |
|---|---|---|---|
| 00000001 | 2 | 123456789 | 3 |

FIG. 25

| Management ID | Communication phase | First pairing value | Second pairing value |
|---|---|---|---|
| 00000001 | 2 | 123456789 | 3 |

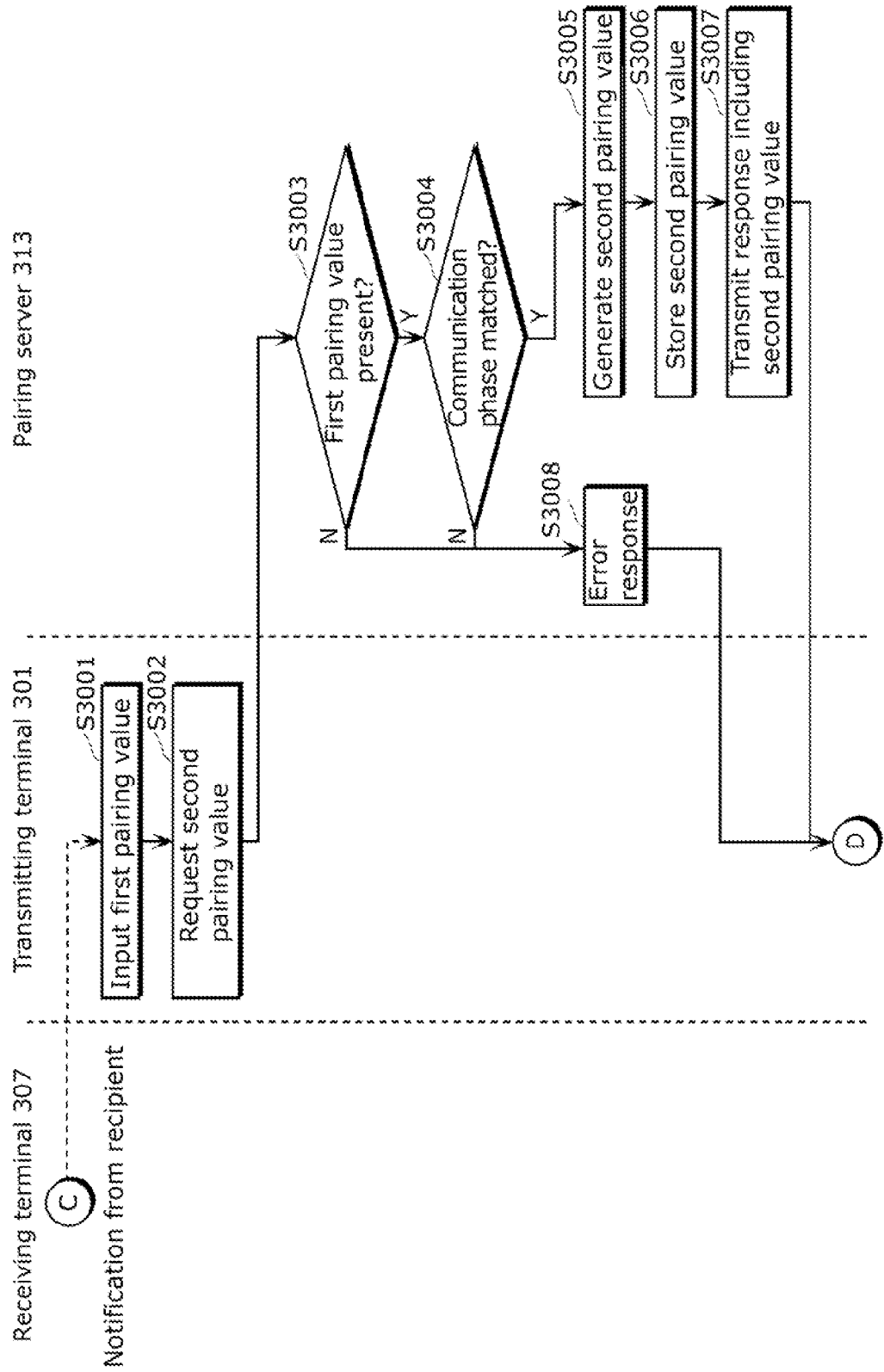

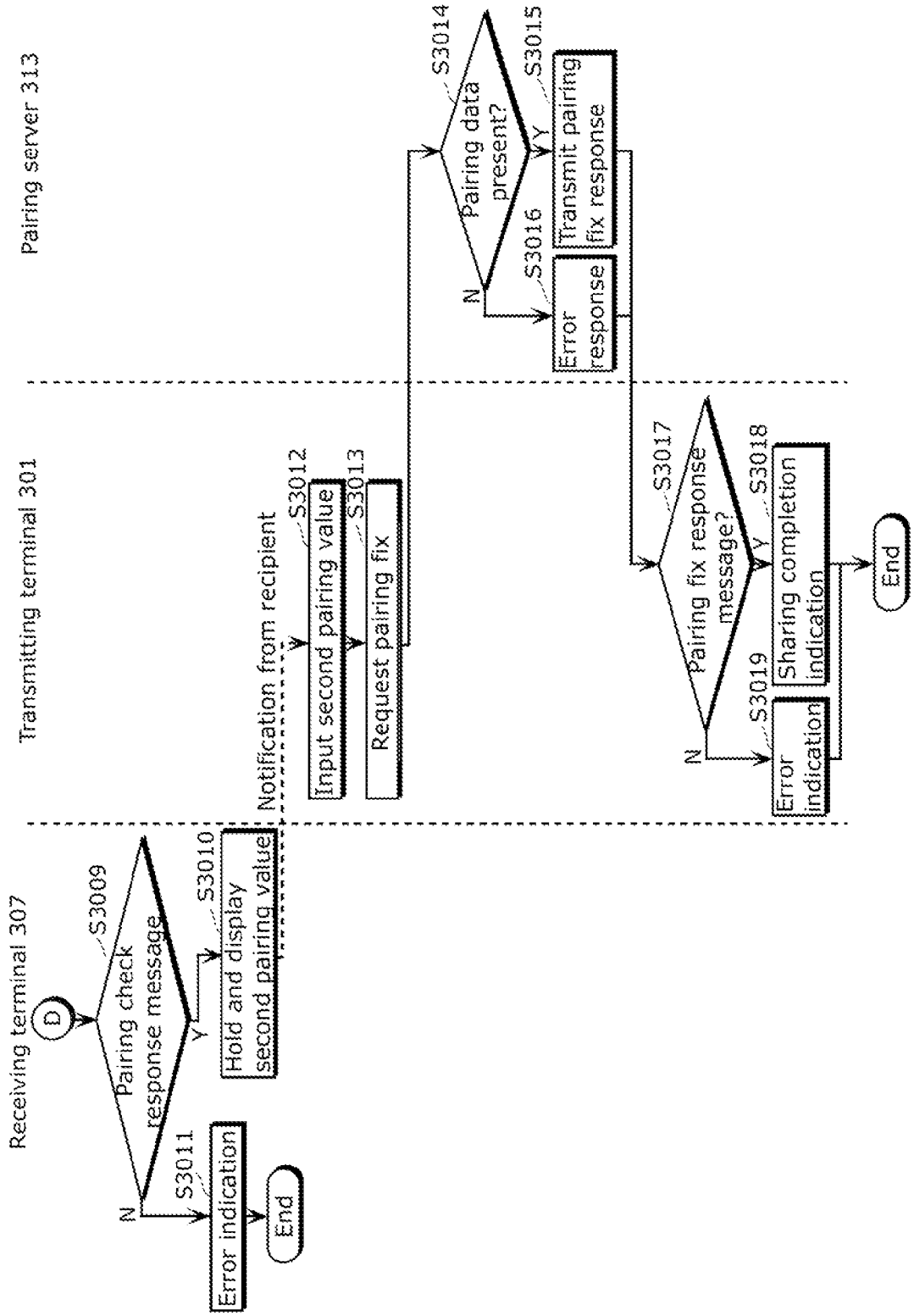

| Management ID | Communication phase | First pairing value | Second pairing value |
|---|---|---|---|
| 00000001 | 2 | 123456789 | 3 |

FIG. 33
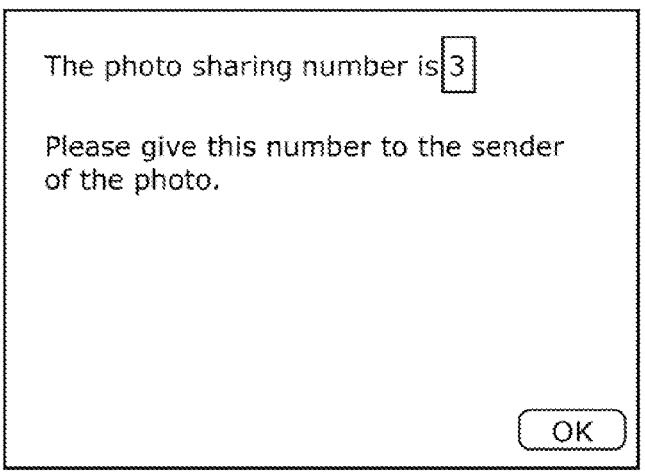
FIG. 34
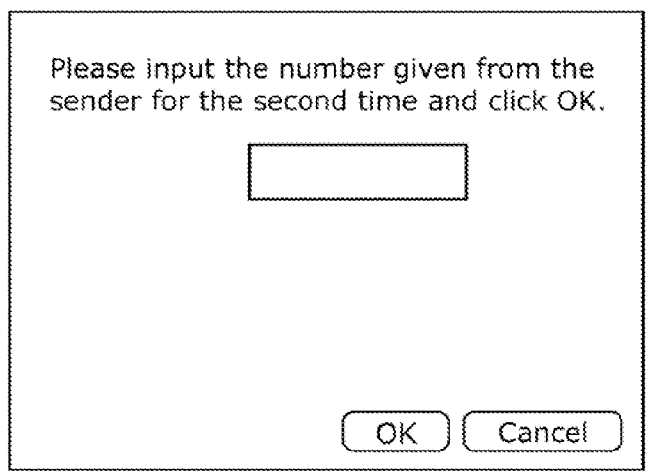
FIG. 35

| Management ID | Communication phase | First pairing value | Second pairing value |
|---|---|---|---|
| 00000001 | 2 | 123456789 | 3 |

FIG. 39

| Receiving terminal ID (3901) | Transmitting terminal ID (3902) | Communication phase (3903) | First pairing value (3904) | Second pairing value (3905) | User level (3906) |
|---|---|---|---|---|---|
| 112233EEFF | | 1 | 123456789 | | 2 |

| Receiving terminal ID | Transmitting terminal ID | Communication phase | First pairing value | Second pairing value | User level |
|---|---|---|---|---|---|
| 112233EEFF | | 1 | 12345 | | 2 |

314a

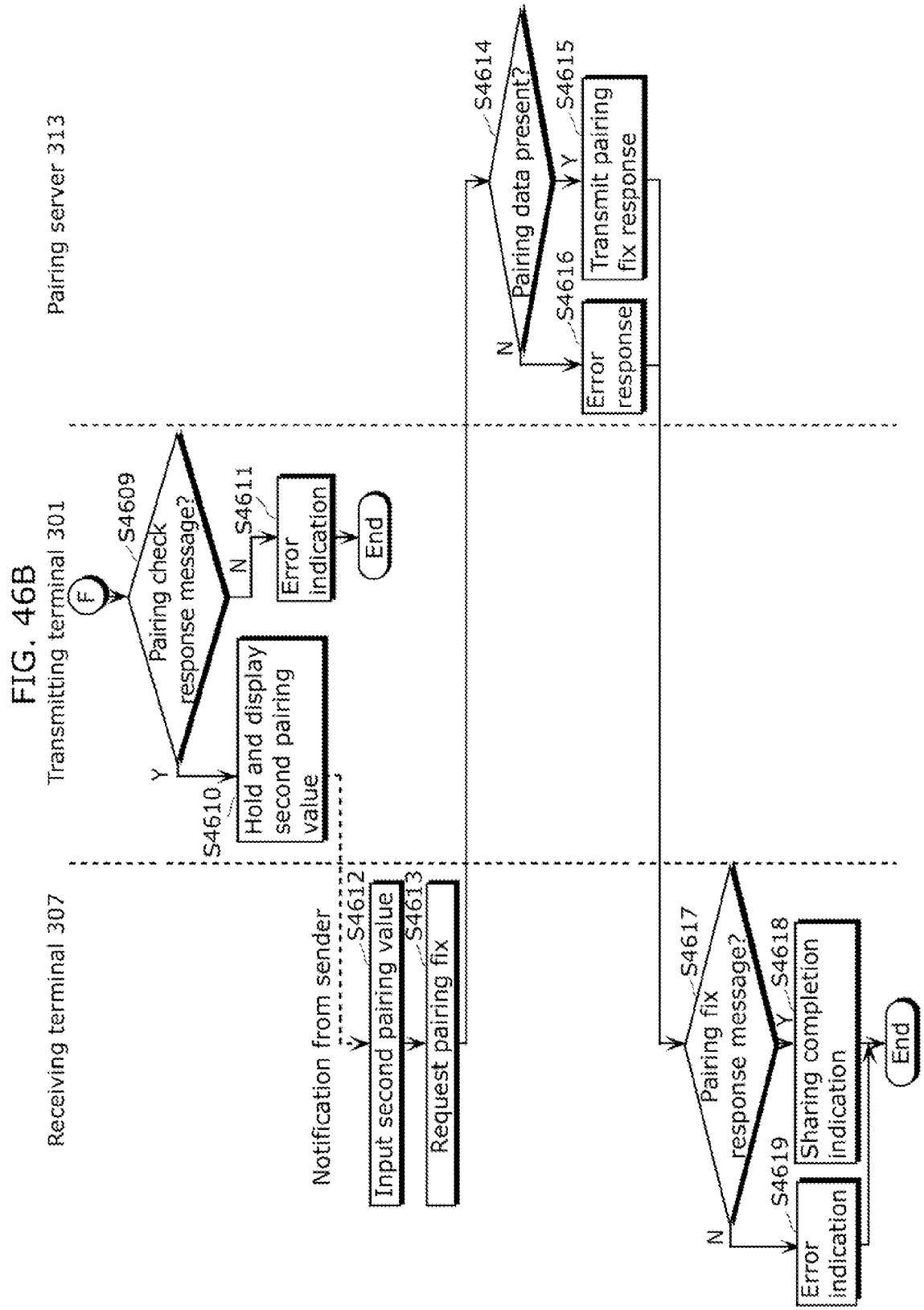

FIG. 47

| Management ID | Communication phase | First pairing value | Second pairing value |
|---|---|---|---|
| 00000001 | 1 | 12345 | |

| Receiving terminal ID | Transmitting terminal ID | Communication phase | First pairing value | Second pairing value | User level |
|---|---|---|---|---|---|
| 112233EEFF | 12345ABCDE | 2 | 12345 | 67890 | 2 |

FIG. 49

| Management ID | Communication phase | First pairing value | Second pairing value |
|---|---|---|---|
| 00000001 | 2 | 12345 | 67890 |

FIG. 51

| Management ID | Communication phase | First pairing value | Second pairing value |
|---|---|---|---|
| 00000001 | 2 | 12345 | 67890 |

COMMUNICATION CONTROL SYSTEM, SERVER DEVICE, COMMUNICATION DEVICE, AND COMMUNICATION CONTROL METHOD

TECHNICAL FIELD

The present invention relates to a communication control system for pairing communication devices to control communication therebetween, and also relates to a server device, such communication devices, and a communication control method.

BACKGROUND ART

In recent years, digital cameras and digital video cameras have been in widespread use, and users increasingly accumulate captured digital photos and digital video (hereinafter referred to as "photos" and "video") in a communication device (hereinafter referred to as "terminal") such as a personal computer (PC) to view them. Along with the widespread use of the Internet, more and more terminals are connected to the network, and content such as the photos and video accumulated in the terminals is exchanged via the network.

In photos and video, objects which entail privacy concerns, such as human faces and residences, often appear. When sharing photos and video with a friend, it is therefore necessary to check and set a destination in advance so as not to transmit the content to an unintended recipient.

For example, PTL 1 discloses a communication control system for sharing photos between television receivers. The communication control system disclosed by PTL 1 is a system for sharing photos between persons who know predetermined identification information (ID).

FIG. 1 is a block diagram showing a configuration of a conventional photo sharing system 100.

In FIG. 1, the photo sharing system 100 includes a transmitting terminal 101, a receiving terminal 102, and a photo sharing server 103. The transmitting terminal 101 is a communication device which is operated by a sender of a photo, and the receiving terminal 102 is a communication device which is operated by a recipient of the photo. The photo sharing server 103 is a server device which issues ID to the transmitting terminal 101 and in which photos to be shared are accumulated.

FIG. 2 is a sequence chart for explaining the operation in the conventional photo sharing system 100. Specifically, FIG. 2 shows how to check and set a destination before photo-sharing.

In Step S201, the transmitting terminal 101 transmits, to the photo sharing server 103, a request for issuing shared ID. The photo sharing server 103 then generates shared ID and transmits the generated shared ID to the transmitting terminal 101 in Step S202.

In Step S203, the transmitting terminal 101 receives the shared ID from the photo sharing server 103 and displays the received shared ID on a screen. The sender notifies the recipient of the shared ID displayed on the screen. The notification is made using a telephone and so on. In Step S204, the receiving terminal 102 receives an input of the shared ID from the recipient who has been notified of the shared ID.

The above description is made on the conventional way to check and set a destination.

Furthermore, in the case of transmitting a photo of a sender from the transmitting terminal 101 to the receiving terminal 102, the transmitting terminal 101 transmits, to the photo sharing server 103, the shared ID and the photo desired to be transmitted. The photo sharing server 103 accumulates the received shared ID and photo in such a way that the received shared ID and photo are associated with each other. Afterward, the receiving terminal 102 transmits, to the photo sharing server 103, the shared ID set in advance, and receives, from the photo sharing server 103, the photo associated with the shared ID, thereby receiving the photo of the sender.

CITATION LIST

Patent Literature

PTL 1
International Publication No. 2008/093781

SUMMARY OF INVENTION

Technical Problem

However, in PTL 1, photos sometimes cannot be correctly shared. For example, the sender may notify the recipient of incorrect shared ID or the recipient may enter incorrect shared ID in the receiving terminal 102.

In such a case, not only the recipient fails to share the photo of the sender but also the receiving terminal 102 receives the photo associated with the entered incorrect shared ID, which are problematic. Furthermore, when a malicious recipient enters arbitrary shared ID in the receiving terminal 102, the receiving terminal 102 can receive the photo associated with that shared ID, which is also problematic.

In other words, the technique of PTL 1 has a problem that data transmitted from the transmitting terminal can be received by the receiving terminal which is not intended to receive the data. This means that the data is transmitted to a recipient who is not intended by a sender, which poses a significant privacy problem.

In view of the above, the present invention has been devised to solve the above conventional problems and has an object to provide a communication control system, a server device, a communication device, and a communication control method, with which, upon pairing communication devices, each of the communication devices can be prevented from being paired with other communication device which is not intended.

Solution to Problem

In order to achieve the object, a communication control system according to an aspect of the present invention is a communication control system for pairing a first communication device and a second communication device to control communication between the first communication device and the second communication device, the communication control system including: the first communication device; the second communication device; and a server device connected to the first communication device and the second communication device, wherein the server device includes: a first generation unit configured to generate a first pairing identifier when the server device receives from the first communication device a first request which requests generation of the first pairing identifier; a first transmitting unit configured to transmit the generated first pairing identifier to the first communication device in response to the first request; a second generation unit configured to generate a second pairing identifier when the server device receives from the second communication device a second request which requests generation of the second pairing identifier and includes the generated first pairing identifier; a second transmitting unit configured to transmit the generated second pairing identifier to the first communication device or the second communication device in response to the second request; and a pairing unit configured to pair the first communication device and the second communication device when the server device receives a third request which requests pairing of the first communication device and the second communication device and includes the first pairing identifier and the second pairing identifier, the first communication device includes a first communication unit configured to transmit the first request to the server device and receive the first pairing identifier from the server device in response to the first request, the second communication device includes a second communication unit configured to transmit the second request to the server device, and the first communication unit or the second communication unit is configured to receive the second pairing identifier from the server device in response to the second request.

With this structure, when the third request which includes the first pairing identifier and the second pairing identifier is transmitted to the server device, the first communication device and the second communication device are paired. Thus, when one of the first pairing identifier and the second pairing identifier is incorrect, the first communication device and the second communication device will merely not be paired; the first communication device or the second communication device will not be paired with other communication device which is not intended.

Furthermore, with this structure, when the first communication device receives the first request, and the second communication device receives the second request, the first communication device and the second communication device are paired. In other words, the first communication device and the second communication device are paired through the cooperative operation of the first communication device and the second communication device. Thus, it becomes possible to prevent the first communication device or the second communication device from being paired with other communication device which is operated by a malicious user.

Furthermore, it is desirable that the server device further include: a first storing unit configured to store the generated first pairing identifier into a storage unit configured to store the first pairing identifier and the second pairing identifier; a second storing unit configured to store the generated second pairing identifier into the storage unit in such a way that the second pairing identifier is associated with the first pairing identifier; and a first determination unit configured to determine, when the server device receives the second request, whether or not the second pairing identifier has been stored in the storage unit in such a way that the second pairing identifier is associated with the first pairing identifier included in the second request, and the second generation unit be configured to generate the second pairing identifier when the first determination unit determines that the second pairing identifier has not been stored in the storage unit.

With this structure, the second pairing identifier is generated when it is determined that the second pairing identifier has not been stored in the storage unit in such a way that the second pairing identifier is associated with the first pairing identifier included in the second request. Accordingly, when the second pairing identifier is generated and then the second request is received from other communication device which is not intended, another generation of the second pairing value can be prevented. Thus, it becomes possible to prevent the first communication device or the second communication device from being paired with other communication device which is operated by a malicious user when such other communication device transmits the second request.

Furthermore, it is desirable that the second transmitting unit be configured to transmit the second pairing identifier to the second communication device, and the second communication unit be configured to receive the second pairing identifier from the server device.

With this structure, the first and the second pairing identifiers generated by the server device are transmitted to respective communication devices which are different from each other. This means that there is a stronger necessity for the first communication device and the second communication device to operate in cooperation with each other for pairing. Thus, it becomes possible to further prevent the first communication device or the second communication device from being paired with other communication device which is operated by a malicious user.

Furthermore, it is desirable that the server device further include a second determination unit configured to determine whether or not a source of the third request is the first communication device, and the pairing unit be configured to pair the first communication device and the second communication device when the second determination unit determines that the source of the third request is the first communication device.

With this structure, the first communication device and the second communication device are paired when it is determined that the source of the third request is the first communication device. This means that, even when other communication device pretends to be the second communication device, the pairing will eventually fail unless the first communication device cooperates. Thus, it becomes possible to further prevent the first communication device or the second communication device from being paired with other communication device which is operated by a malicious user.

Furthermore, it is desirable that the first communication unit be further configured to transmit the third request to the server device, and the first communication device further include a first management unit configured to (i) determine, before the first communication unit transmits the third request to the server device, whether or not the first communication unit has received from the server device the first pairing identifier included in the third request, and (ii) prohibit, when the first communication unit has not received the first pairing identifier from the server device, the first communication unit from transmitting to the server device the third request which includes the first pairing identifier.

With this structure, the first communication device can be prohibited from transmitting to the server device the third request which includes the first pairing identifier which the first communication device has not received from the server device. This means that the transmission of the third request to the server device in an erroneous procedure can be prevented so that the first communication device and the second communication device can be more reliably paired.

Furthermore, it is desirable that the first communication device further include: a display unit configured to display the first pairing identifier received by the first communication unit; and an input unit configured to receive an input of the second pairing identifier, and the first communication unit be configured to transmit to the server device the third request which includes the first pairing identifier displayed by the display unit and the second pairing identifier received by the input unit.

With this structure, the first communication device is capable of transmitting to the server device the third request which includes the first pairing identifier displayed by the display unit and the second pairing identifier received by the input unit.

Furthermore, it is desirable that the first communication device include a first notifying unit configured to notify the second communication device of the first pairing identifier received by the first communication unit, and the second communication device include a second notifying unit configured to notify the first communication device of the second pairing identifier received by the second communication unit.

With this structure, there is no need for a user to make notification of the first pairing identifier and the second pairing identifier, with the result that erroneous notification of the first pairing identifier and the second pairing identifier by a user can be prevented.

Furthermore, it is desirable that the second transmitting unit be configured to transmit the second pairing identifier to the first communication device, and the first communication unit be configured to receive the second pairing identifier from the server device.

With this structure, the first and the second pairing identifiers generated by the server device are both transmitted to the first communication device. This means that a user who operates the first communication device does not need to enter the second pairing identifier in the first communication device. Thus, the operation load on the user who operates the first communication device can be reduced.

Furthermore, it is desirable that the server device further include a second determination unit configured to determine whether or not a source of the third request is the second communication device, and the pairing unit be configured to pair the first communication device and the second communication device when the second determination unit determines that the source of the third request is the second communication device.

With this structure, when it is determined that the source of the third request is the second communication device, the first communication device and the second communication device are paired. This means that the second communication device needs to obtain the second pairing identifier from the first communication device from which the second pairing identifier has been transmitted. Thus, it becomes possible to further prevent the first communication device or the second communication device from being paired with other communication device which is operated by a malicious user.

Furthermore, it is desirable that the second communication unit be further configured to transmit the third request to the server device, and the second communication device further include a second management unit configured to (i) determine, before the second communication unit transmits the third request to the server device, whether or not the second communication unit has transmitted to the server device the second request which includes the first pairing identifier included in the third request, and (ii) prohibit, when the second communication unit has not transmitted to the server device the second request which includes the first pairing identifier, the second communication unit from transmitting the third request to the server device.

With this structure, the second communication device can be prohibited from transmitting to the server device the third request which includes the first pairing identifier which the second communication device has not transmitted to the server device. This means that the transmission of the third request to the server device in an erroneous procedure can be prevented so that the first communication device and the second communication device can be more reliably paired.

Furthermore, it is desirable that the second communication device further include an input unit configured to receive an input of the first pairing identifier and an input of the second pairing identifier, and the second communication unit be configured to transmit to the server device the second request which includes the first pairing identifier received by the input unit, and transmit to the server device the third request which includes the first and the second identifiers received by the input unit.

With this structure, the third request which includes the first and the second pairing identifiers received by the input unit can be transmitted to the server device.

Furthermore, it is desirable that the first communication device further include a notifying unit configured to notify the second communication device of the first and the second pairing identifiers received by the first communication unit.

With this structure, a user who operates the first communication device does not need to make notification of the first pairing identifier and the second pairing identifier, with the result that erroneous notification of the first pairing identifier and the second pairing identifier by a user can be prevented.

Furthermore, it is desirable that the first request include level information indicating a level of an operation skill of a user who operates the first communication device, and the second generation unit be configured to generate the second pairing identifier such that a degree of complexity of the second pairing identifier decreases as the level indicated by the level information decreases.

With this structure, the second pairing identifier can be generated such that the degree of complexity of the second pairing identifier decreases as the level indicated by the level information decreases. Thus, according to the operation skill of a user who operates the first communication device, the operation load on the user can be reduced. The erroneous input of the second pairing identifier by the user can therefore be prevented, with the result that the first communication device and the second communication device can be more reliably paired.

Furthermore, it is desirable that the first generation unit be configured to generate the first pairing identifier such that a degree of complexity of the first pairing identifier increases as the level indicated by the level information decreases.

With this structure, the degree of complexity of the first pairing identifier can be increased when the degree of complexity of the second pairing identifier decreases. Thus, an excessive decrease in the degree of complexity of the whole pairing identifiers, that is, a combination of the first pairing identifier and the second pairing identifier, can be prevented. Accordingly, the security deterioration can be prevented while the erroneous input of the pairing identifier by a user can be prevented.

Furthermore, a server device according to an aspect of the present invention is a server device connected to a first communication device and a second communication device, for pairing the first communication device and the second communication device to control communication between the first communication device and the second communication device, the server device including: a first generation unit configured to generate a first pairing identifier when the server device receives from the first communication device a first request which requests generation of the first pairing identifier; a first transmitting unit configured to transmit the generated first pairing identifier to the first communication device in response to the first request; a second generation unit configured to generate a second pairing identifier when the server device receives from the second communication device a second request which requests generation of the second pairing identifier and includes the generated first pairing identifier; a second transmitting unit configured to transmit the generated second pairing identifier to the first communication device or the second communication device in response to the second request; and a pairing unit configured to pair the first communication device and the second communication device when the server device receives a third request which requests pairing of the first communication device and the second communication device and includes the first pairing identifier and the second pairing identifier.

This structure can provide the same effects as the above communication control system.

Furthermore, a communication device according to an aspect of the present invention is a communication device which is paired with another communication device by a server device, the communication device including: a communication unit configured to (i) transmit to the server device a first request which requests generation of a first pairing identifier, (ii) receive from the server device the first pairing identifier generated by the server device, in response to the first request, and (iii) transmit to the server device a third request which requests pairing of the communication device and the other communication device and includes the received first pairing identifier and a second pairing identifier transmitted from the server device to the other communication device; and a management unit configured to (i) determine, before the communication unit transmits the third request to the server device, whether or not the communication unit has received from the server device the first pairing identifier included in the third request, and (ii) prohibit, when the communication unit has not received the first pairing identifier from the server device, the communication unit from transmitting the third request to the server device.

With this structure, the third which includes the first pairing identifier not received from the server device can be prohibited from being transmitted to the server device. This means that the transmission of the third request to the server device in an erroneous procedure can be prevented so that the communication device and other communication device can be more reliably paired.

Furthermore, a communication device according to an aspect of the present invention is a communication device which is paired with another communication device by a server device, the communication device including: a communication unit configured to (i) transmit to the server device a second request which requests generation of a second pairing identifier and includes a first pairing identifier transmitted to the other communication device, and (ii) transmit to the server device a third request which requests pairing of the communication device and the other communication device and includes the first pairing identifier and the second pairing identifier transmitted to the other communication device in response to the second request; and a management unit configured to (i) determine, before the communication unit transmits the third request to the server device, whether or not the communication unit has transmitted to the server device the second request which includes the first pairing identifier included in the third request, and (ii) prohibit, when the communication unit has not transmitted to the server device the second request which includes the first pairing identifier, the communication unit from transmitting the third request to the server device.

With this structure, the third which includes the first pairing identifier not transmitted to the server device can be prohibited from being transmitted to the server device. This means that the transmission of the third request to the server device in an erroneous procedure can be prevented so that the communication device and other communication device can be more reliably paired.

Furthermore, a communication control method according to an aspect of the present invention is a communication control method by which a server device connected to a first communication device and a second communication device pairs the first communication device and the second communication device to control communication between the first communication device and the second communication device, the communication control method including: generating a first pairing identifier when the server device receives from the first communication device a first request which requests generation of the first pairing identifier; transmitting the generated first pairing identifier to the first communication device in response to the first request; generating a second pairing identifier when the server device receives from the second communication device a second request which requests generation of the second pairing identifier and includes the generated first pairing identifier; transmitting the generated second pairing identifier to the first communication device or the second communication device in response to the second request; and pairing the first communication device and the second communication device when the server device receives a third request which requests pairing of the first communication device and the second communication device and includes the first pairing identifier and the second pairing identifier.

This structure can provide the same effects as the above communication control system.

Advantageous Effects of Invention

According to the present invention, the first communication device and the second communication device are paired through the cooperative operation of the first communication device and the second communication device. Thus, in pairing the first communication device and the second communication device, the first communication device or the second communication device can be prevented from being paired with other communication device which is not intended.

BRIEF DESCRIPTION OF DRAWINGS

FIG. 2 is a sequence chart for explaining the operation in the conventional communication control system.

FIG. 4 shows an example of data stored in a phase management unit of a transmitting terminal in Embodiment 1 of the present invention.

FIG. 5 shows an example of data stored in a phase management unit of a receiving terminal in Embodiment 1 of the present invention.

FIG. 6 shows an example of a pairing management table stored in a pairing management unit of the pairing server in Embodiment 1 of the present invention.

FIG. 10 shows an example of the pairing management table in Embodiment 1 of the present invention.

FIG. 18 shows an example of the pairing management table in Embodiment 1 of the present invention.

FIG. 21 shows an example of data stored in the phase management unit of the transmitting terminal in Embodiment 1 of the present invention.

FIG. 25 shows an example of data stored in the phase management unit of the receiving terminal in Embodiment 1 of the present invention.

FIG. 30A is a flowchart showing processing in a pairing check phase in Embodiment 2 of the present invention.

FIG. 30B is a flowchart showing processing in the pairing check phase in Embodiment 2 of the present invention.

FIG. 33 shows a display example of a second pairing value in the receiving terminal in Embodiment 2 of the present invention.

FIG. 34 shows an example of a screen for receiving an input of the second pairing value in a transmitting terminal in Embodiment 2 of the present invention.

FIG. 35 shows message data included in a pairing fix request message in Embodiment 2 of the present invention.

FIG. 39 shows an example of a pairing management table in Embodiment 3 of the present invention.

FIG. 44 shows an example of the pairing management table in Embodiment 3 of the present invention.

FIG. 46B is a flowchart showing processing in the pairing check phase in Embodiment 3 of the present invention.

FIG. 47 shows an example of data stored in a phase management unit of the receiving terminal in Embodiment 3 of the present invention.

FIG. 48 shows an example of the pairing management table in Embodiment 3 of the present invention.

FIG. 49 shows an example of data stored in the phase management unit of a transmitting terminal in Embodiment 3 of the present invention.

FIG. 51 shows an example of a phase management table in Embodiment 3 of the present invention.

DESCRIPTION OF EMBODIMENTS

Embodiments of the present invention are described below with reference to the drawings. It is to be noted that each of Embodiments described below illustrates one desirable specific example of the present invention. Numeric values, shapes, materials, constituents, positions and topologies of the constituents, steps, an order of the steps, and the like in the following Embodiments are an example of the present invention, and it should therefore not be construed that the present invention is limited to each of these Embodiments. The present invention is specified based on descriptions in the scope of the claims. Thus, out of the constituents in the following Embodiments, the constituents not stated in the independent claims describing the broadest concept of the present invention are not always necessary to achieve the object of the present invention, but are described as constituents in a more desirable embodiment.

Embodiment 1

Figure 1:
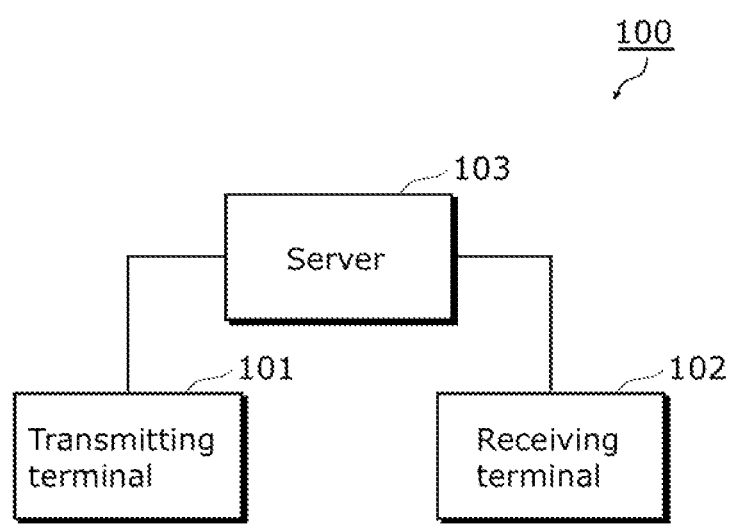
FIG. 1 is a block diagram showing a configuration of a conventional communication control system.
Figure 3A:
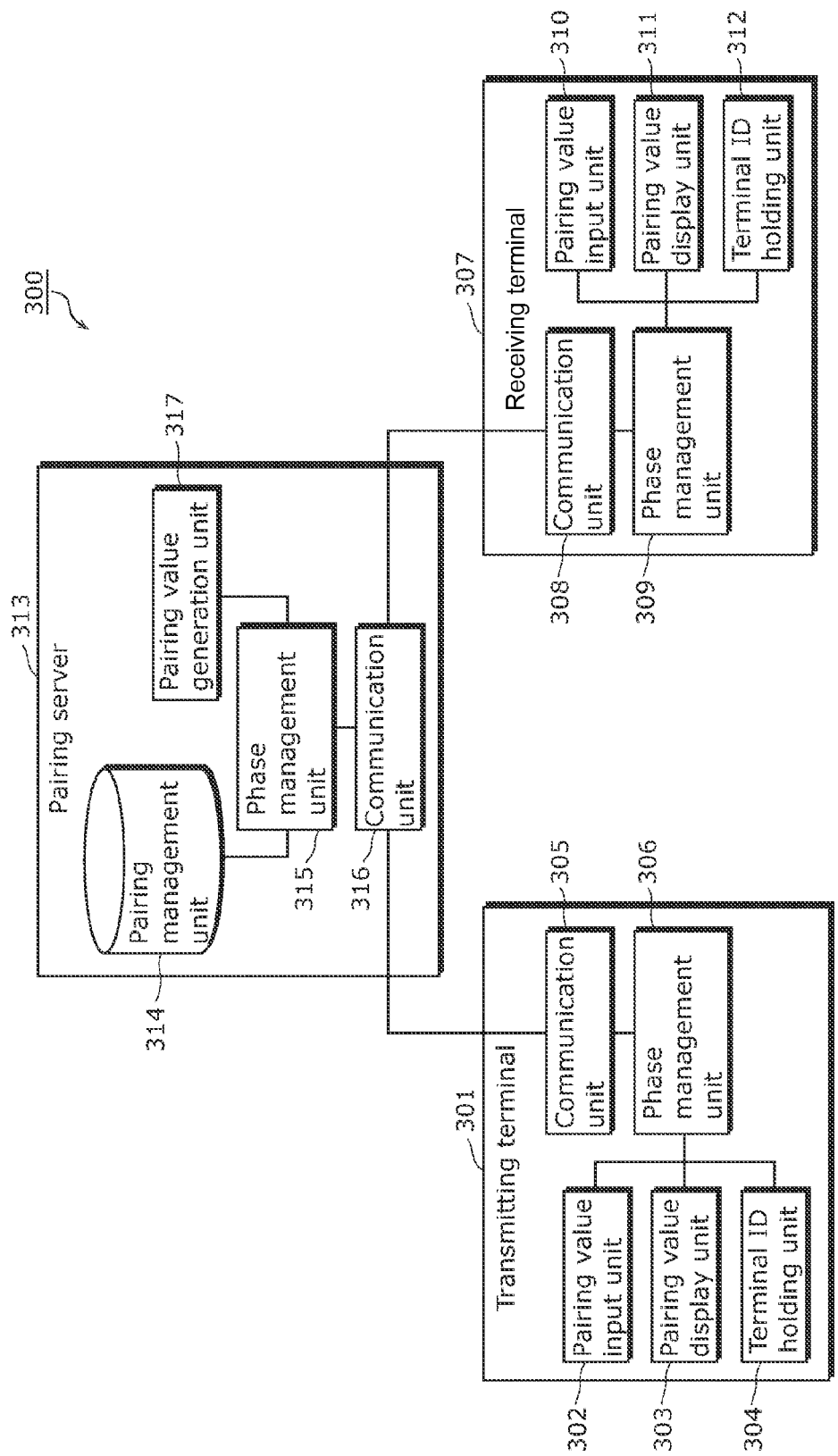
FIG. 3A is a block diagram showing a configuration of a communication control system in Embodiment 1 of the present invention.
Figure 3B:
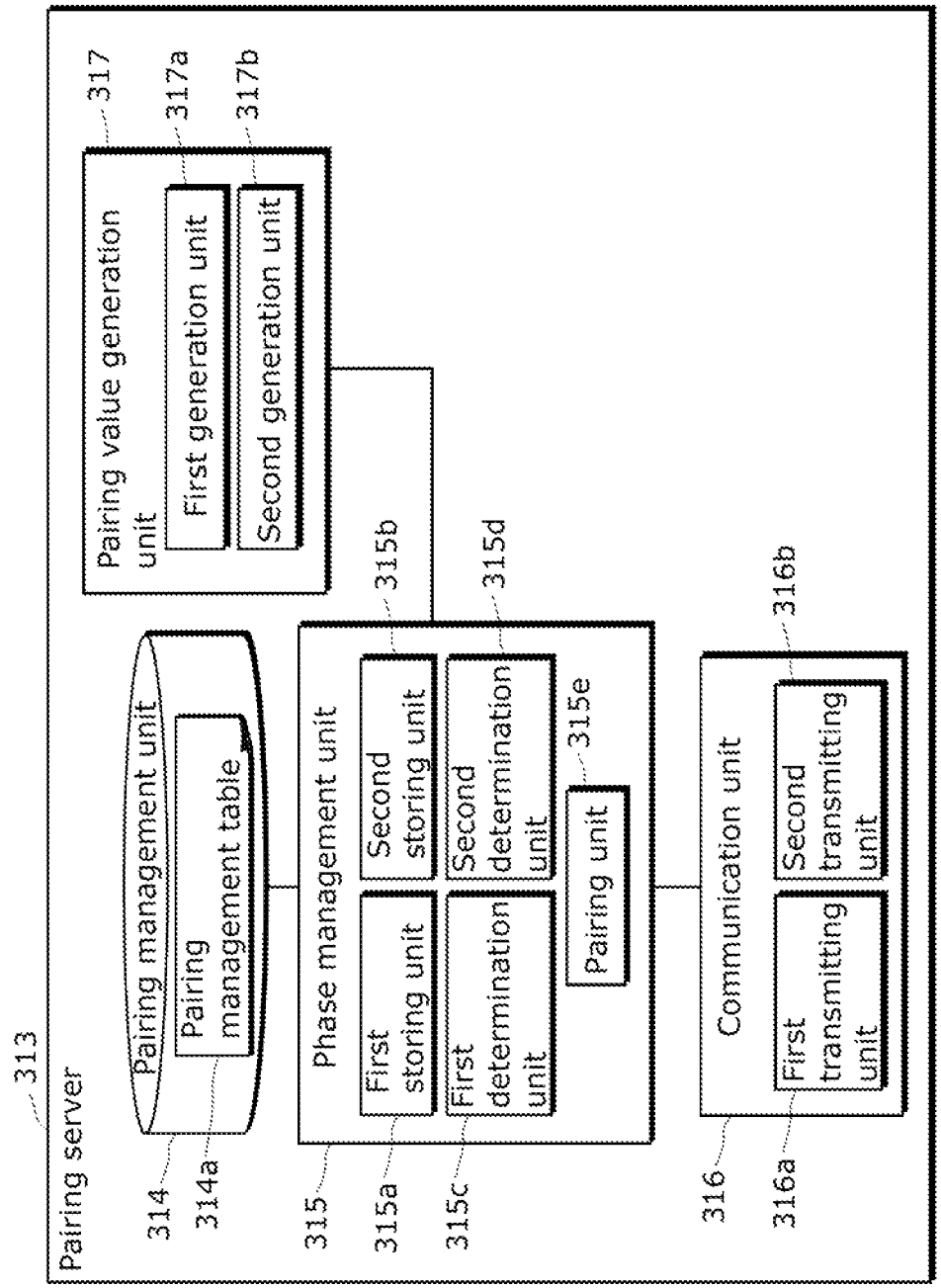
FIG. 3B is a block diagram showing a detailed configuration of a pairing server in Embodiment 1 of the present invention.

FIG. 3A is a block diagram showing a communication control system 300 in Embodiment 1 of the present invention. FIG. 3B is a block diagram showing a detailed configuration of a pairing server 313 in Embodiment 1 of the present invention.

As shown in FIG. 3A, the communication control system 300 includes a transmitting terminal 301, a receiving terminal 307, and a pairing server 313 connected to the transmitting terminal 301 and the receiving terminal 307 via the network, for example.

The transmitting terminal 301 corresponds to a second communication device and holds content such as photos. The transmitting terminal 301 includes a pairing value input unit 302, a pairing value display unit 303, a terminal ID holding unit 304, a communication unit 305, and a phase management unit 306.

The receiving terminal 307 corresponds to a first communication device and receives content such as photos from the transmitting terminal 301 and displays it. The receiving terminal 307 includes a communication unit 308, a phase management unit 309, a pairing value input unit 310, a pairing value display unit 311, and a terminal ID holding unit 312.

The pairing server 313 corresponds to a server device and pairs the transmitting terminal 301 and the receiving terminal permitted to receive the content transmitted from the transmitting terminal 301. The pairing server 313 includes a pairing management unit 314, a phase management unit 315, a communication unit 316, and a pairing value generation unit 317.

Each of the constituent units of the transmitting terminal 301 is described.

The pairing value input unit 302 receives an input of a first pairing value from a sender who operates the transmitting terminal 301. Specifically, the pairing value input unit 302 is an input circuit implemented as a key board, a touch panel, or a remote control device, for example.

Pairing means associating the transmitting terminal 301 that transmits content such as photos, with the receiving terminal 307 that receives the content, in order to control communication between the two terminals, namely, the transmitting terminal 301 and the receiving terminal 307. In this embodiment, pairing also means limiting the transmission and receiving of the content only to the two terminals which are associated with each other. In other words, two terminals share content as a result of pairing in this embodiment.

Furthermore, the first pairing value is an example of a first pairing identifier and is a number sequence given by a recipient who operates the receiving terminal 307. To make notification of the first pairing value, a notifying means which the sender and the recipient use daily is used. The notifying means includes a telephone, an electronic mail, and a mobile phone electronic mail. The first pairing value entered through the pairing value input unit 302 is displayed on the pairing value display unit 303. The first pairing identifier does not always need to be a number sequence like the first pairing value and may include a character or a symbol, for example.

The pairing value display unit 303 is a liquid crystal touch panel display, for example. The pairing value display unit 303 displays the first pairing value entered by a sender through the pairing value input unit 302. Furthermore, the pairing value display unit 303 displays a second pairing value received from the pairing server 313 via the communication unit 305.

The second pairing value is an example of a second pairing identifier and is a number sequence received from the pairing server 313. The second pairing identifier does not always need to be a number sequence like the second pairing value and may include a character or a symbol, for example.

The terminal ID holding unit 304 is a memory circuit implemented as a flash memory which holds identification information unique to the terminal. The terminal ID is written in the terminal ID holding unit 304 at the factory before shipment or is written in the terminal ID holding unit 304 through the communication unit 305 via the network after shipment from the factory, depending on the case.

The communication unit 305 is a communication circuit implemented as a network interface which provides communication of the pairing value and the terminal ID with the pairing server 313.

The phase management unit 306 manages communication phases. The communication phases include a pairing phase in which the transmitting terminal 301 and the receiving terminal 307 are associated with each other during message communication with the pairing server 313, and a pairing check phase in which the association is fixed. In this embodiment, the pairing server 313 associates the transmitting terminal 301 with the receiving terminal 307 in the pairing phase and subsequently fixes the pairing in the pairing check phase without errors by checking whether or not there is any error in the association made in the pairing phase.

FIG. 4 shows an example of data stored in the phase management unit 306 of the transmitting terminal 301. In FIG. 4, management ID 401 is an identifier for identifying a set of the communication phase, the first pairing value, and the second pairing value.

A communication phase 402 indicates which one of the pairing phase and the pairing check phase is the current communication phase. Here, "1" is stored in the communication phase 402 when the current communication phase is the pairing phase, and "2" is stored in the communication phase 402 when the current communication phase is the pairing check phase. It is to be noted that the above values are an example and any value may be used as long as they can identify the two phases.

In a first pairing value 403, the first pairing value given by a recipient who operates the receiving terminal 307 and received by the pairing value input unit 302 is stored. In a second pairing value 404, the second pairing value received from the pairing server 313 is stored.

Subsequently, each of the constituent units of the receiving terminal 307 is described.

The communication unit 308 is a communication circuit implemented as a network interface which provides communication of the pairing value and the terminal ID with the pairing server 313.

The phase management unit 309 manages communication phases. Detailed processing by the phase management unit 309 will be described later.

FIG. 5 shows an example of data stored in the phase management unit 309 of the receiving terminal 307. In FIG. 5, management ID 501 is an identifier for identifying a set of the communication phase, the first pairing value, and the second pairing value. A communication phase 502 indicates which one of the pairing phase and the pairing check phase is the current communication phase. Here, "1" is stored in the communication phase 502 when the current communication phase is the pairing phase, and "2" is stored in the communication phase 502 when the current communication phase is the pairing check phase. It is to be noted that the above values are an example and any value may be used as long as they can identify the two phases. In first pairing value 503, the first pairing value received from the pairing server 313 is stored. In a second pairing value 504, the second pairing value given by a sender who operates the transmitting terminal 301 and entered through the pairing value input unit 310 is stored.

The pairing value input unit 310 receives an input of the second pairing value from a recipient who operates the receiving terminal 307. Specifically, the pairing value input unit 310 is an input circuit implemented as a key board, a touch panel, or a remote control device, for example.

The second pairing value is an example of the second pairing identifier and is a number sequence given by a sender who operates the transmitting terminal 301. To make notification of the second pairing value, a notifying means which the sender and the recipient use daily is used. The notifying means includes a telephone, an electronic mail, and a mobile phone electronic mail. The second pairing value entered through the pairing value input unit 310 is displayed on the pairing value display unit 311.

The pairing value display unit 311 is a liquid crystal touch panel display, for example. The pairing value display unit 311 displays the second pairing value entered by a recipient through the pairing value input unit 310. Furthermore, the pairing value display unit 311 displays a first pairing value received from the pairing server 313 via the communication unit 308.

The terminal ID holding unit 312 is a memory circuit implemented as a flash memory which holds identification information unique to the terminal. The terminal ID is written in the terminal ID holding unit 312 at the factory before shipment or is written in the terminal ID holding unit 312 through the communication unit 308 via the network after shipment from the factory, depending on the case.

Furthermore, each of the constituent units of the pairing server 313 is described.

The pairing management unit 314 corresponds to a storage unit for storing the first pairing value and the second pairing value and is, for example, a memory device such as hard disk drive (HDD). The pairing management unit 314 stores a pairing management table 314a that is used to pair the transmitting terminal 301 and the receiving terminal 307 permitted to receive the content transmitted from the transmitting terminal 301.

FIG. 6 shows an example of the pairing management table 314a stored in the pairing management unit 314. As shown in FIG. 6, the pairing management table 314a includes receiving terminal ID 601, transmitting terminal ID 602, a communication phase 603, a first pairing value 604, and a second pairing value 605.

In the receiving terminal ID 601, the terminal ID of the receiving terminal 307 received from the receiving terminal 307 via the communication unit 316 is stored. In the transmitting terminal ID 602, the terminal ID of the transmitting terminal 301 received from the transmitting terminal 301 via the communication unit 316 is stored. The communication phase 603 indicates which one of the pairing phase and the pairing check phase is the current communication phase. Here, "1" is stored in the communication phase 603 when the current communication phase is the pairing phase, and "2" is stored in the communication phase 603 when the current communication phase is the pairing check phase. In the first pairing value 604, the first pairing value generated by the pairing value generation unit 317 and transmitted to the receiving terminal 307 by the communication unit 316 is stored. In the second pairing value 605, the first pairing value generated by the pairing value generation unit 317 and transmitted to the transmitting terminal 301 by the communication unit 316 is stored. In FIG. 6, a blank column indicates that still no value is stored.

It is to be noted that the pairing management unit 314 does not always need to store the first pairing value and the second pairing value into a table like the pairing management table 314a. In other words, the pairing management unit 314 may store the first pairing value and the second pairing value in any form as long as the first pairing value and the second pairing value can be stored in association with each other.

The phase management unit 315 is an electronic circuit for managing communication phases. As shown in FIG. 3B, the phase management unit 315 includes a first storing unit 315a, a second storing unit 315b, a first determination unit 315c, a second determination unit 315d, and a pairing unit 315e. A detail of each of the constituent units will be described later.

The communication unit 316 is a communication circuit implemented as a network interface which provides communication of the pairing value and the terminal ID with the transmitting terminal 301 and the receiving terminal 307. As shown in FIG. 3B, the communication unit 316 includes a first transmitting unit 316a and a second transmitting unit 316b. A detail of each of the constituent units will be described later.

The pairing value generation unit 317 is a random number generation unit which generates the first or the second pairing value which is transmitted to the receiving terminal 307 or the transmitting terminal 301. As shown in FIG. 3B, the pairing value generation unit 317 includes a first generation unit 317a and a second generation unit 317b. A detail of each of the constituent units will be described later.

Next, various operations in the communication control system 300 configured as above are specifically described.

Figure 7:
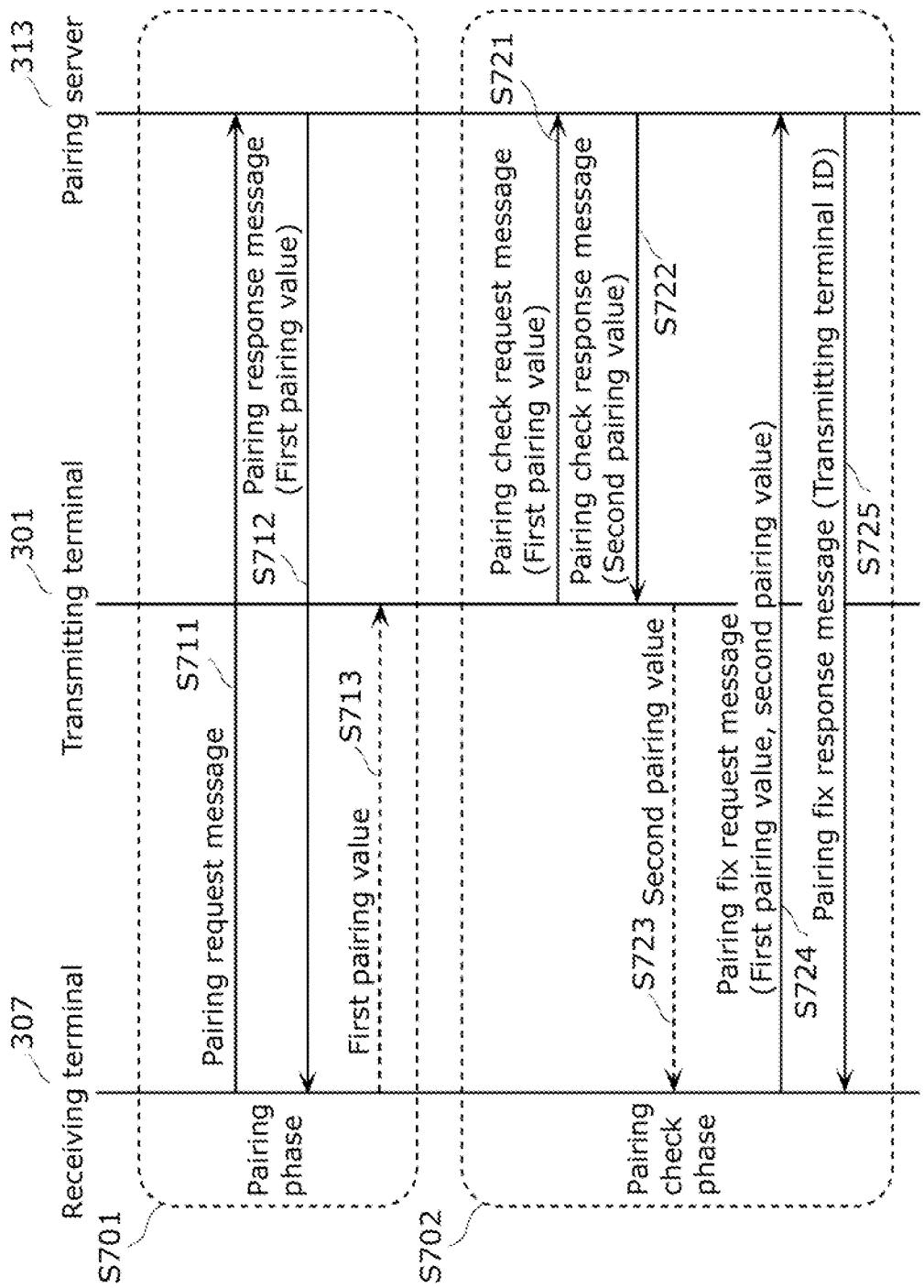
FIG. 7 is a sequence chart for explaining an outline of processing of the communication control system in Embodiment 1 of the present invention.

FIG. 7 is a sequence chart for explaining an outline of processing of the communication control system 300 in Embodiment 1 of the present invention. Specifically, FIG. 7 shows a flow of communication data in pairing processing of associating the terminals which share content.

The pairing processing includes the pairing phase (Step S701) and the pairing check phase (Step S702). At the start of the pairing phase, none of the management data, shown in FIG. 4, which the transmitting terminal 301 manages and the management data, shown in FIG. 5, which the receiving terminal 307 manages is present. Furthermore, in the pairing management table 314a, shown in FIG. 6, which is stored in the pairing server 313, there are no data relating to the transmitting terminal 301 and the receiving terminal 307.

In such a circumstance, first, the communication unit 308 of the receiving terminal 307 transmits, to the pairing server 313, a pairing request message requesting generation of the first pairing value (Step S711). This pairing request message corresponds to a first request.

Here, the first generation unit 317a of the pairing server 313 generates the first pairing value. Furthermore, the first storing unit 315a of the pairing server 313 stores the generated first pairing value into the pairing management table 314a. The first transmitting unit 316a of the pairing server 313 then transmits, to the receiving terminal 307, a pairing response message which includes the generated first pairing value (Step S712).

A recipient who operates the receiving terminal 307 notifies, using a notification means such as a telephone, a sender who operates the transmitting terminal 301, of the first pairing value received by the receiving terminal 307 (Step S713).

Next, the communication unit 305 of the transmitting terminal 301 transmits, to the pairing server 313, a pairing check request message requesting generation of the second pairing value (Step S721). This pairing check request message corresponds to a second request and includes the first pairing value given by the recipient.

Here, the second generation unit 317b of the pairing server 313 generates the second pairing value. Furthermore, the second storing unit 315b of the pairing server 313 stores the generated second pairing value into the pairing management table 314a in such a way that the second pairing value is associated with the first pairing value. The second transmitting unit 316b of the pairing server 313 then transmits, to the transmitting terminal 301, a pairing check response message which includes the generated second pairing value (Step S722).

The sender who operates the transmitting terminal 301 notifies, using a notification means such as a telephone, the recipient who operates the receiving terminal 307, of the second pairing value received by the transmitting terminal 301 (Step S723). The communication unit 308 of the receiving terminal 307 transmits, to the pairing server 313, a pairing fix request message requesting pairing of the transmitting terminal 301 and the receiving terminal 307 (Step S724). This pairing fix request message corresponds to a third request and includes the first pairing value and the second pairing value.

Lastly, the pairing unit 315e of the pairing server 313 pairs the transmitting terminal 301 and the receiving terminal 307 and transmits, to the receiving terminal 307, a pairing fix response message which includes the identifier of the transmitting terminal 301 (Step S725).

Thus, the pairing is not completed at the end of the pairing phase (Step S701), but is completed at the end of the pairing check phase (Step S702).

Figure 8:
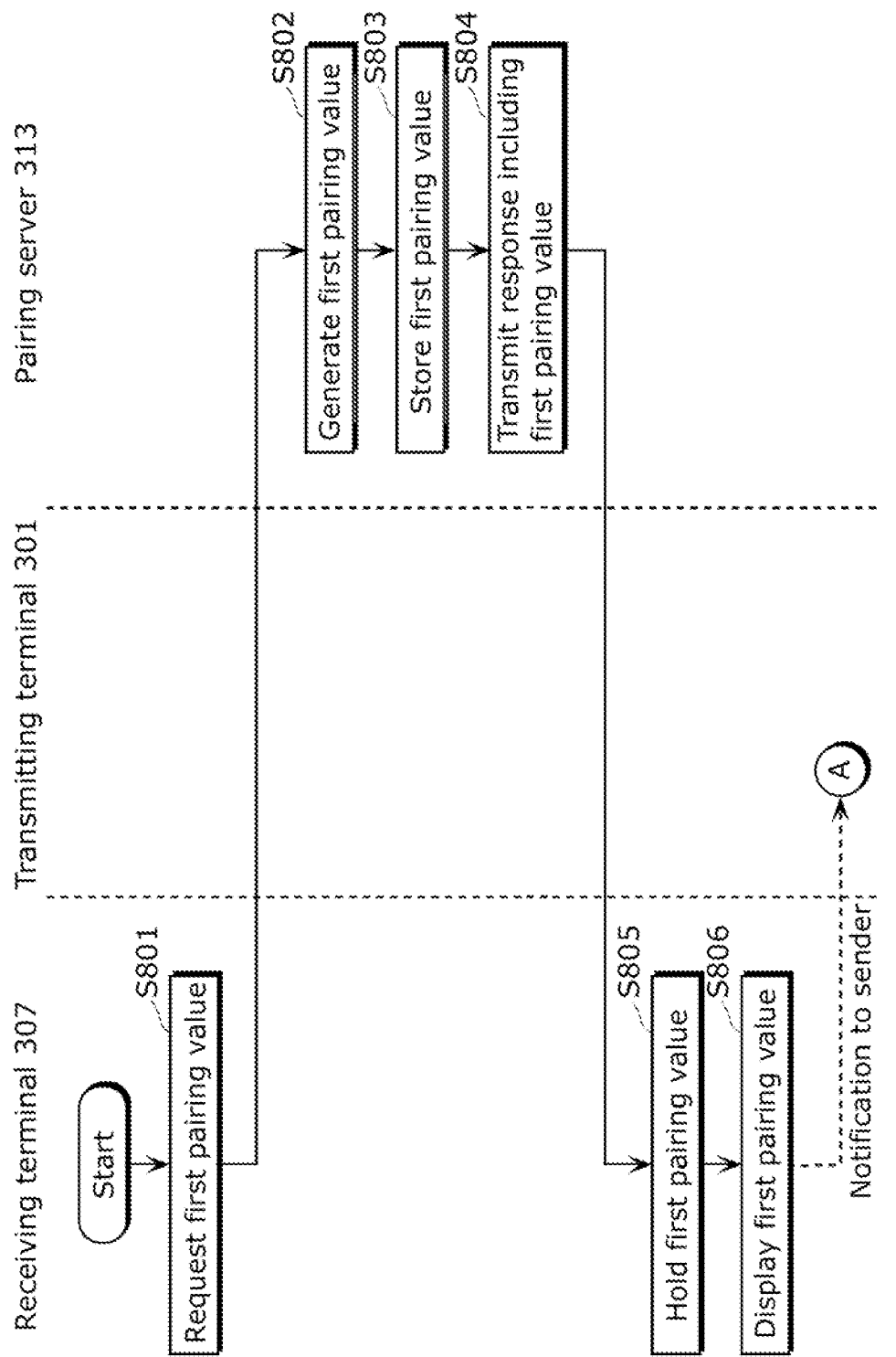
FIG. 8 is a flowchart showing processing at a pairing phase in Embodiment 1 of the present invention.

FIG. 8 is a flowchart showing processing in the pairing phase. With reference to FIG. 8, various processing in the pairing phase is described.

(Step S801)

According to an instruction of the recipient, the receiving terminal 307 transmits the pairing request message (the first request) to the pairing server 313. The following describes specific processing of transmitting the pairing request message.

Figure 9:
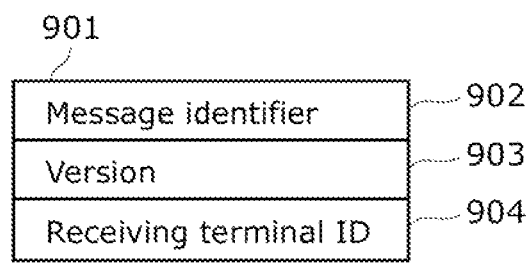
FIG. 9 shows message data included in a pairing request message in Embodiment 1 of the present invention.

FIG. 9 shows message data included in the pairing request message. A pairing request message 901 includes, as the message data, a message identifier 902, a version 903, and receiving terminal ID 904.

The message identifier 902 is message data for identifying the message which is exchanged between the pairing server 313 and the receiving terminal 307.

The version 903 is message data for identifying a version number of the pairing request message. When the message data included in the message have any change such as addition or deletion due to system expansion, the version number is increased. Each of the pairing server and the terminal compares a value of the version number included in the message with the version number which the device itself supports, to thereby determine whether to be able to handle the message.

The receiving terminal ID 904 is message data indicating the terminal ID of the receiving terminal 307 that is a terminal which transmits the pairing request message.

The recipient selects "sharing setup (receiving)" menu on a menu screen of the receiving terminal 307. Upon selection of "sharing setup (receiving)" menu, the phase management unit 309 of the receiving terminal 307 generates such pairing request message 901. In generating the pairing request message 901, the phase management unit 309 sets "0001" indicating the pairing request message, "0100" indicating a default version, and the terminal ID held by the terminal ID holding unit 312, respectively, for the message identifier 902, the version 903, and the receiving terminal ID 904. Afterward, the phase management unit 309 transmits the generated pairing request message 901 to the pairing server 313 via the communication unit 308.

(Step S802)

The first generation unit 317a of the pairing server 313 generates the first pairing value when the pairing request message 901 is received from the receiving terminal 307. The first pairing value is, for example, a random number value and is desirably a new value which has not been stored as the first pairing value in the pairing management table 314a. In this embodiment, it is assumed that the first pairing value is "123456789".

(Step S803)

The first storing unit 315a stores, into the pairing management table 314a, a phase number, the receiving terminal ID included in the received pairing request message 901, and the first pairing value generated in Step S802, in such a way that the phase number, the receiving terminal ID, and the first pairing value are associated with one another. In the phase number, "1" indicating the pairing phase is stored.

FIG. 10 shows an example of the pairing management table 314a at the end of Step S803. In FIG. 10, the columns for the transmitting terminal ID and the second pairing value are blank because the transmitting terminal ID and the second pairing value are still not set.

(Step S804)

The first transmitting unit 316a transmits the pairing response message to the receiving terminal 307. The pairing response message includes the first pairing value generated in Step S802. The following describes specific processing of transmitting the pairing response message.

Figures 11, 12:
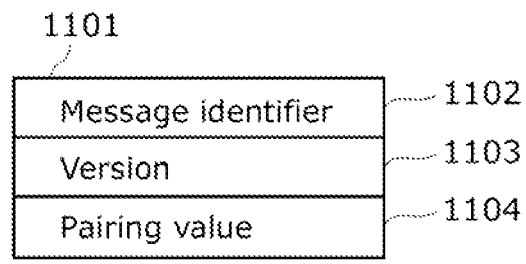
FIG. 11 shows message data included in a pairing response message in Embodiment 1 of the present invention.
FIG. 12 shows an example of data stored in the phase management unit of the receiving terminal in Embodiment 1 of the present invention.

FIG. 11 shows message data included in the pairing response message. A pairing response message 1101 includes, as the message data, a message identifier 1102, a version 1103, and a pairing value 1104.

The message identifier 1102 is message data for identifying the message which is exchanged between the pairing server 313 and the receiving terminal 307. The version 1103 is message data for identifying a version number of the pairing response message. The pairing value 1104 is message data indicating the first pairing value generated in Step S802.

The phase management unit 315 generates such pairing response message 1101. In generating the pairing response message 1101, the phase management unit 315 sets "0002" indicating the pairing response message, "0100" indicating a default version, and the first pairing value "123456789" generated in Step S802, respectively, for the message identifier 1102, the version 1103, and the pairing value 1104. Afterward, the first transmitting unit 316a transmits the generated pairing response message 1101 to the receiving terminal 307.

(Step S805)

The communication unit 308 of the receiving terminal 307 receives the pairing response message from the pairing server 313. Afterward, the phase management unit 309 holds the first pairing value included in the received message.

FIG. 12 shows an example of data stored in the phase management unit 309. In FIG. 12, the column for the second pairing value is blank because notification of the second pairing value has not been made.

(Step S806)

Figure 13:
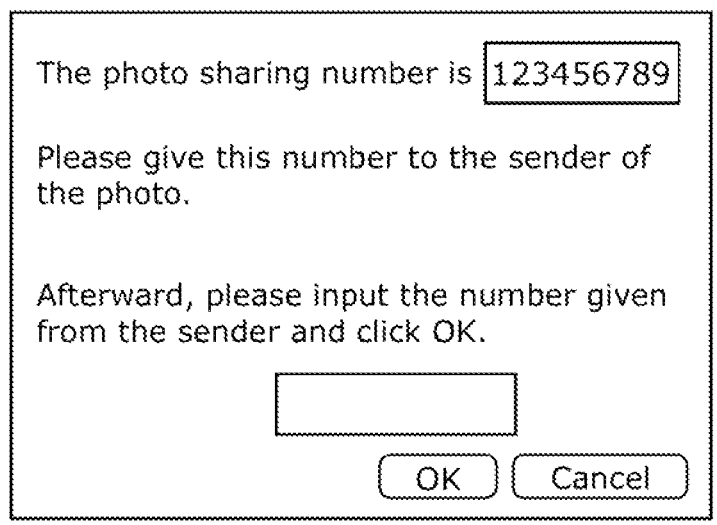
FIG. 13 shows a display example of a first pairing value in the receiving terminal in Embodiment 1 of the present invention.

The phase management unit 309 causes the pairing value display unit 311 of the receiving terminal 307 to display the first pairing value included in the received pairing response message. FIG. 13 shows a display example of the first pairing value. The recipient who operates the receiving terminal 307 notifies the sender of the first pairing value displayed by the pairing value display unit 311. To make notification of the first pairing value, a notifying means which the sender and the recipient use daily may be used. The notifying means includes a telephone, an electronic mail, and a mobile phone electronic mail.

The description on processing in the pairing phase ends here.

Subsequently, processing in the pairing check phase is described with reference to FIGS. 14A and 14B.

Figure 14A:
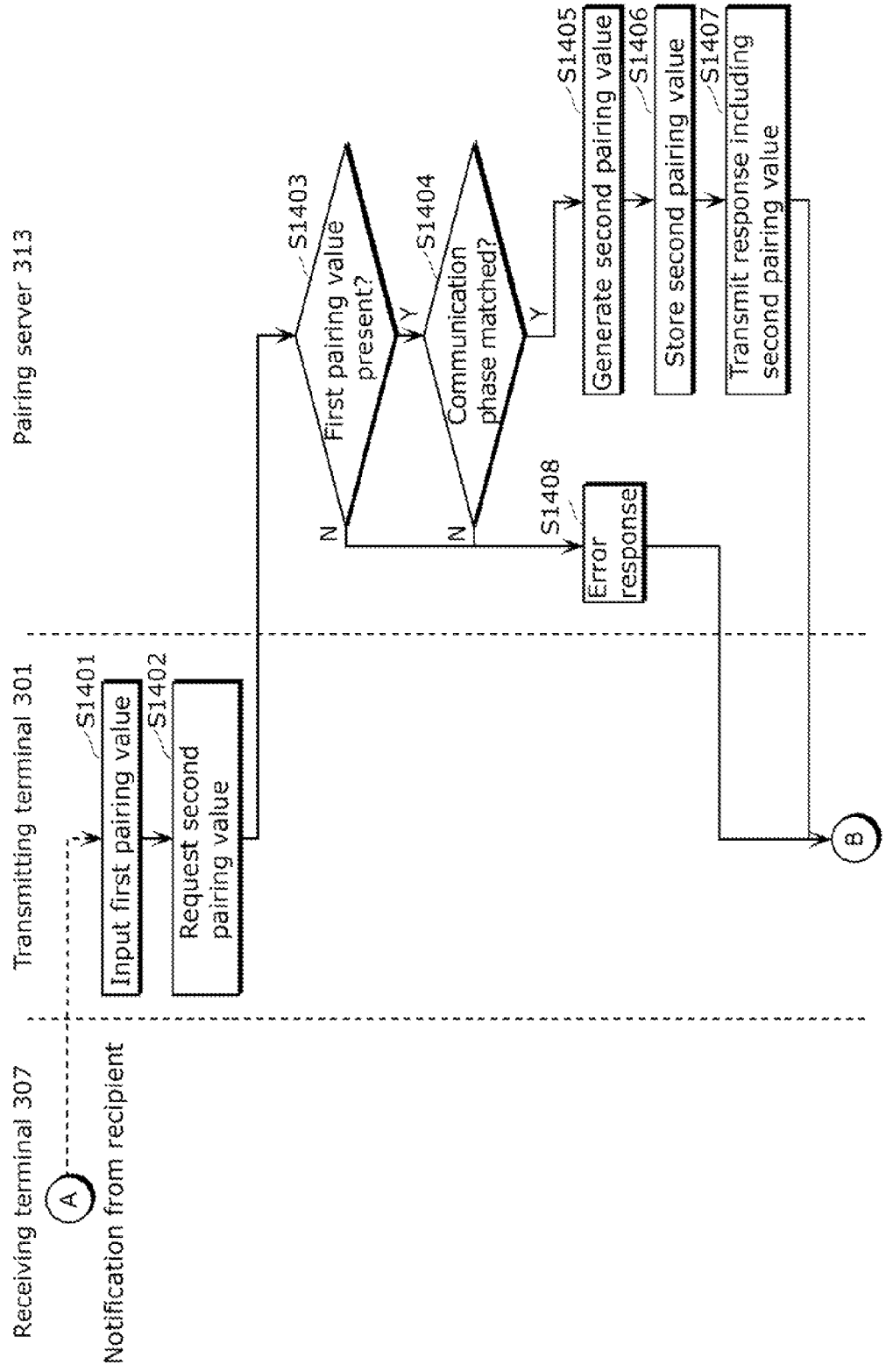
FIG. 14A is a flowchart showing processing in a pairing check phase in Embodiment 1 of the present invention.
Figure 14B:
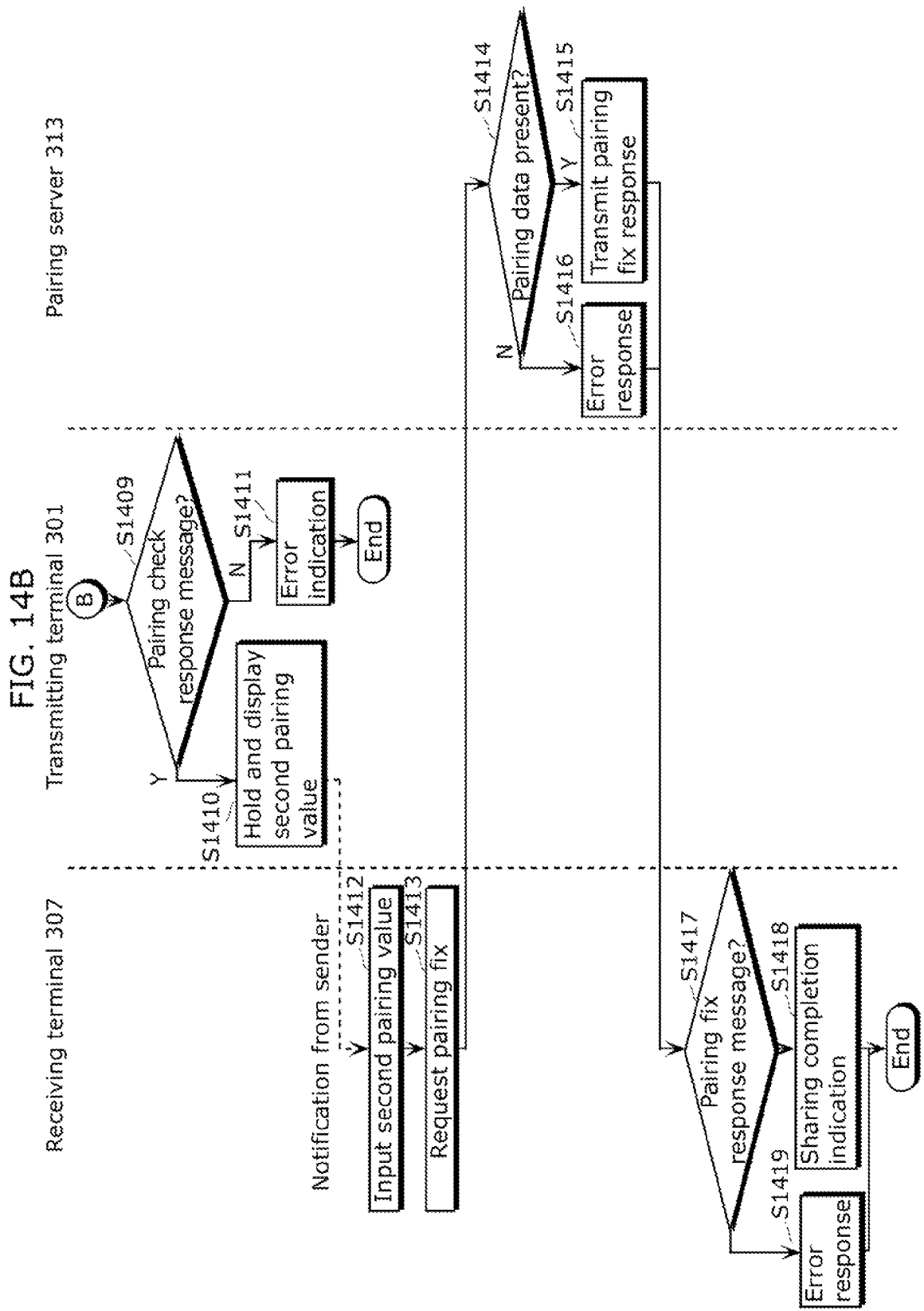
FIG. 14B is a flowchart showing processing in the pairing check phase in Embodiment 1 of the present invention.

FIGS. 14A and 14B are a flowchart showing the processing in the pairing check phase.

(Step S1401)

The sender enters, in the transmitting terminal 301, the first pairing value given by the recipient. In entering the first pairing value, the sender selects "sharing setup (transmitting)" from among menus displayed on the transmitting terminal 301. Upon selection of "sharing setup (transmitting)" menu, the pairing value input unit 302 displays a pairing value input-receiving screen and receives an input of the first pairing value.

Figure 15:
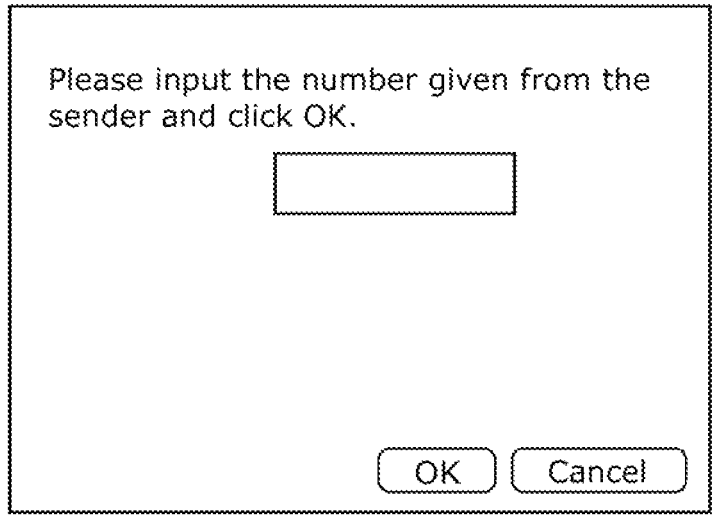
FIG. 15 shows an example of a screen for receiving an input of the first pairing value in the transmitting terminal in Embodiment 1 of the present invention.

FIG. 15 shows an example of the screen for receiving an input of the first pairing value. Afterward, the phase management unit 306 of the transmitting terminal 301 holds the first pairing value entered.

Figures 16, 17:
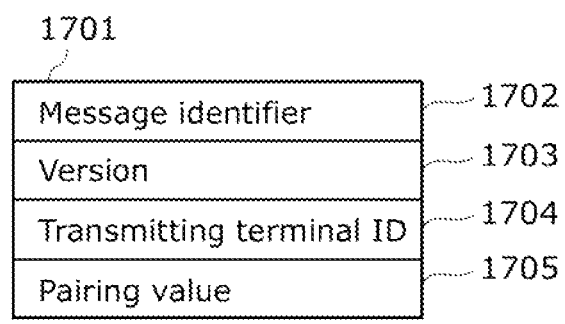
FIG. 16 shows an example of data stored in the phase management unit of the transmitting terminal in Embodiment 1 of the present invention.
FIG. 17 shows message data included in a pairing check request message in Embodiment 1 of the present invention.

FIG. 16 shows an example of data stored in the phase management unit 309. In FIG. 16, the column for the second pairing value is blank because notification of the second pairing value has not been made.

(Step S1402)

After completion of input of the first pairing value, the transmitting terminal 301 transmits the pairing check request message (the second request) to the pairing server 313. The following describes specific processing of transmitting the pairing check request message.

FIG. 17 shows message data included in a pairing check request message. A pairing check request message 1701 includes, as the message data, a message identifier 1702, a version 1703, transmitting terminal ID 1704, and a pairing value 1705.

The message identifier 1702 is message data for identifying the message which is exchanged between the pairing server 313 and the transmitting terminal 301. The version 1703 is message data for identifying a version number of the pairing check response message. The transmitting terminal ID 1704 is message data indicating the terminal ID of the transmitting terminal 301 that is a terminal which transmits the pairing check request message. The pairing value 1705 is message data indicating the first pairing value entered in Step S1401.

The phase management unit 306 generates such pairing check request message 1701. In generating the pairing check request message 1701, the phase management unit 306 sets "0003" indicating the pairing request message, "0100" indicating a default version, the terminal ID held by the terminal ID holding unit 304, and the first pairing value entered through the pairing value input unit 302 in Step S1401, respectively, for the message identifier 1702, the version 1703, the transmitting terminal ID 1704, and the pairing value 1705. Afterward, the phase management unit 306 transmits the generated pairing check request message 1701 to the pairing server 313 via the communication unit 305.

(Step S1403)

The communication unit 316 of the pairing server 313 receives the pairing check request message 1701 from the transmitting terminal 301. The first determination unit 315c then searches the pairing management table 314a stored in the pairing management unit 314 for the first pairing value included in the received pairing check request message. When the search result shows that the first pairing value included in the pairing check request message has been stored in the pairing management table 314a (Y in Step S1403), the pairing server 313 then executes the processing of Step S1404. On the other hand, when the first pairing value included in the pairing check request message has not been stored in the pairing management table 314a (N in Step S1403), the pairing server 313 then executes the processing of Step S1408.

(Step S1404)

When the first pairing value included in the pairing check request message has been stored in the pairing management table 314a (Y in Step S1403), the first determination unit 315c refers to the pairing management table 314a to further determine whether or not the communication phase corresponding to the first pairing value included in the pairing check request message is the pairing phase.

When the communication phase is the pairing phase, the second pairing value has not yet been stored in the pairing management table 314a. Thus, the first determination unit 315c determines whether or not the communication phase is the pairing phase, to thereby determine whether or not the second pairing value has been stored in the pairing management table 314a in such a way that the second pairing value is associated with the first pairing value included in the pairing check request message.

This checking of the communication phase can be performed by checking a value stored in the communication phase of the pairing management table 314a. Specifically, when the value in the communication phase is "1" (Y in Step S1404), the pairing server 313 executes the processing of Step S1405 next. On the other hand, when the value in the communication phase is "2" (N in Step S1404), the pairing server 313 executes the processing of Step S1408 next.

(Step S1405)

When the communication phase corresponding to the first pairing value included in the pairing check request message (Y in Step S1404), the second generation unit 317b generates the second pairing value. Specifically, when it is determined that the second pairing value has not yet been stored in the pairing management table 314a in such a way that the second pairing value is associated with the first pairing value included in the pairing check request message, the second generation unit 317b generates the second pairing value. The second pairing value is, for example, a random number value and is desirably a new value which has not been stored as the second pairing value in the pairing management table 314a. In the embodiment of the present invention, it is assumed that the second pairing value is "3".

(Step S1406)

The second storing unit 315b stores, into the pairing management table 314a, the transmitting terminal ID included in the received pairing check request message 1701 and the second pairing value generated in Step S1405, in such a way that each of them is associated with the first pairing value. At this time, the second storing unit 315b rewrites the phase number from "1" indicating the pairing phase to "2" indicating the pairing check phase.

FIG. 18 shows an example of the pairing management table 314a at the end of Step S1406.

(Step S1407)

The second transmitting unit 316b transmits the pairing check response message to the transmitting terminal 301. The following describes specific processing of transmitting the pairing check response message.

Figure 19:
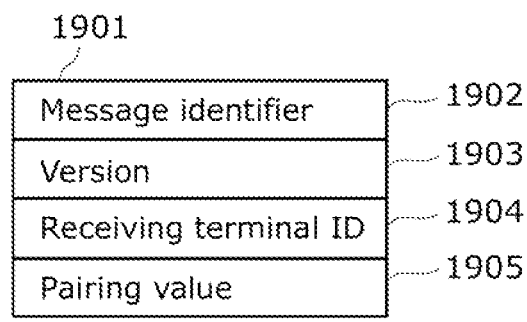
FIG. 19 shows message data included in a pairing check response message in Embodiment 1 of the present invention.

FIG. 19 shows message data included in the pairing check response message. A pairing check response message 1901 includes, as the message data, a message identifier 1902, a version 1903, receiving terminal ID 1904, and a pairing value 1905.

The message identifier 1902 is message data for identifying the message which is exchanged between the pairing server 313 and the transmitting terminal 301. The version 1903 is message data for identifying a version number of the pairing check response message. The receiving terminal ID 1904 is message data indicating a value of the receiving terminal ID managed in association with the terminal ID and the pairing value searched for in Step S1403. The pairing value 1905 is message data indicating the second pairing value generated in Step S1405.

The phase management unit 315 generates such pairing check response message 1901. In generating the pairing check response message 1901, the phase management unit 315 sets "0004" indicating the pairing check response message, "0100" indicating a default version, the ID (i.e., "112233EEFF" in the example of FIG. 18) of a corresponding receiving terminal, and the second pairing value "3" generated in Step S1405, respectively, for the message identifier 1902, the version 1903, the receiving terminal ID 1904, and the pairing value 1905. Afterward, the second transmitting unit 316b transmits the generated pairing check response message 1901 to the transmitting terminal 301.

(Step S1408)

When the first pairing value included in the pairing check request message has not been stored in the pairing management table 314a (N in Step S1403) or when the communication phase corresponding to the first pairing value included in the pairing check request message is not the pairing phase (N in Step S1404), the second transmitting unit 316b of the pairing server 313 transmits an error message to the transmitting terminal 301. In other words, the second generation unit 317b does not generate the second pairing value. The following describes specific processing of transmitting the error message.

Figure 20:
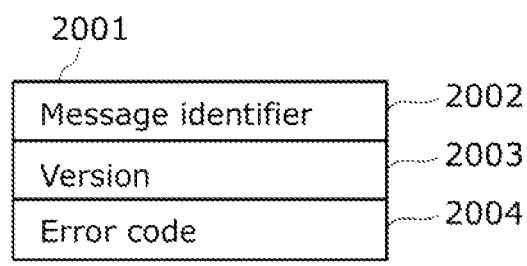
FIG. 20 shows message data included in an error message in Embodiment 1 of the present invention.

FIG. 20 shows message data included in the error message. An error message 2001 includes, as the message data, a message identifier 2002, a version 2003, and an error code 2004. The message identifier 2002 is message data for identifying the message which is exchanged between the pairing server 313 and the transmitting terminal 301. The version 2003 is message data for identifying a version number of the error message. The error code 2004 is message data indicating details of an error and is, for example, numerical data.

The phase management unit 315 of the pairing server 313 generates such error message 2001. In generating the error message 2001, the phase management unit 315 sets "FFFF" indicating an error message, "0100" indicating a default version, and an error code, respectively, for the message identifier 2002, the version 2003, and the error code 2004.

The error code is as follows. When there is no data in Step S1403, "0001" is given, and when the value of the communication phase is different in Step S1404 (when the communication phase is the pairing check phase), "0002" is given. Afterward, the second transmitting unit 316b transmits the generated error message 2001 to the transmitting terminal 301.

(Step S1409)

The communication unit 305 of the transmitting terminal 301 receives the message from the pairing server 313. The phase management unit 306 then distinguishes the received message. When the message identifier included in the received message is "0004" indicating the pairing check response message (Y in Step S1409), the transmitting terminal 301 executes the processing of Step S1410 next. When the message identifier included in the received message is "FFFF" indicating the error message (N in Step S1409), the transmitting terminal 301 executes the processing of Step S1411 next. Also when the message identifier included in the received message is other than "0004" and "FFFF" (N in Step S1409), the transmitting terminal 301 executes the processing of Step S1411 next.

(Step S1410)

The phase management unit 306 holds the second pairing value included in the received pairing check response message. FIG. 21 shows an example of data stored in the phase management unit 306. Afterward, the phase management unit 306 causes the pairing value display unit 303 of the transmitting terminal 301 to display the second pairing value.

Figure 22:
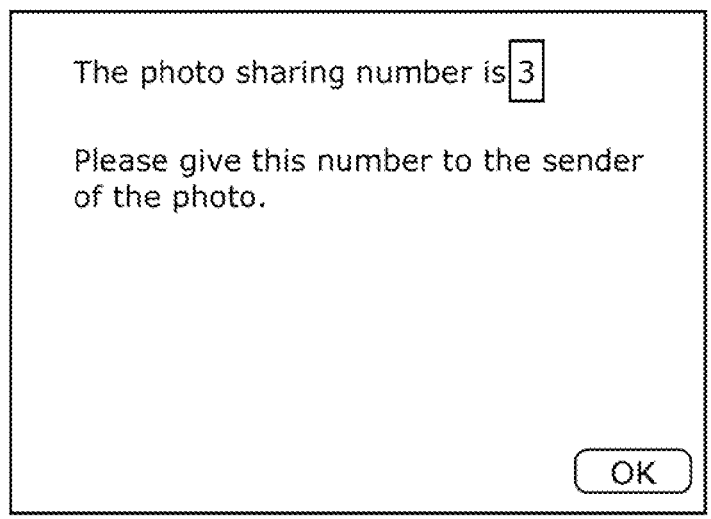
FIG. 22 shows a display example of a second pairing value in the transmitting terminal in Embodiment 1 of the present invention.

FIG. 22 shows a display example of the second pairing value. The sender who operates the transmitting terminal 301 notifies the recipient of the second pairing value displayed by the pairing value display unit 303. To make notification of the second pairing value, a notifying means which the sender and the recipient use daily may be used. The notifying means includes a telephone, an electronic mail, and a mobile phone electronic mail.

(Step S1411)

The phase management unit 306 displays a processing error indication on the screen and deletes the pairing-related data stored therein. Afterward, the sender who operates the transmitting terminal 301 notifies the recipient that the processing is an error. To make this notification, a notifying means which the sender and the recipient use daily is used. The notifying means includes a telephone, an electronic mail, and a mobile phone electronic mail.

(Step S1421)

Using the pairing value input unit 310, the recipient enters, in the receiving terminal 307, the second pairing value given by the sender. The second pairing value is entered on the screen shown in FIG. 13. When notified by the sender that the processing is an error, the recipient selects "Cancel" and re-executes the sharing setup from the start. Upon selection of "Cancel", the phase management unit 309 of the receiving terminal 307 deletes the pairing-related data stored therein.

(Step S1413)

After the second pairing value is entered, the communication unit 308 of the receiving terminal 307 transmits the pairing fix request message (the third request) to the pairing server 313. The following describes specific processing of transmitting the pairing fix request message.

Figure 23:
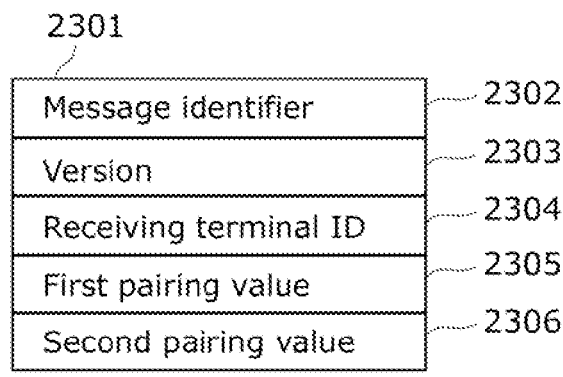
FIG. 23 shows message data included in a pairing fix request message in Embodiment 1 of the present invention.

FIG. 23 shows message data included in the pairing fix request message. A pairing fix request message 2301 includes, as the message data, a message identifier 2302, a version 2303, receiving terminal ID 2304, a first pairing value 2305, and a second pairing value 2306.

The message identifier 2302 is message data for identifying the message which is exchanged between the pairing server 313 and the receiving terminal 307. The version 2303 is message data for identifying a version number of the pairing request message. The receiving terminal ID 2304 is message data indicating the terminal ID of the receiving terminal 307 that is a terminal which transmits the pairing fix request message. The first pairing value 2305 is message data indicating the first pairing value. The second pairing value 2306 is message data indicating the second pairing value.

The phase management unit 309 of the receiving terminal 307 generates such pairing fix request message 2301. In generating the pairing fix request message 2301, the phase management unit 309 sets "0005" indicating the pairing fix request message, "0100" indicating a default version, the terminal ID held by the terminal ID holding unit 312, the first pairing value stored in the phase management unit 309, and the second pairing value entered in Step S1411, respectively, for the message identifier 2302, the version 2303, the receiving terminal ID 2304, the first pairing value 2305, and the second pairing value 2306. Afterward, the communication unit 308 transmits the generated pairing fix request message 2301 to the pairing server 313.

It is to be noted that whether to transmit this pairing fix request message is managed by the phase management unit 309. Specifically, before the communication unit 308 transmits the pairing fix request message to the pairing server 313, the phase management unit 309 determines whether or not the first pairing value included in that pairing fix request message has already been received from the pairing server 313. Here, when the first pairing value has not yet been received from the pairing server 313, the phase management unit 309 prohibits the communication unit 308 from transmitting, to the pairing server 313, the pairing fix request message which includes that first pairing value.

This allows the receiving terminal 307 to be prevented from transmitting, to the pairing server 313, the pairing fix request message which includes the first pairing value that has not been received from the pairing server 313. In other words, the transmission of the pairing fix request message to the pairing server 313 in an erroneous procedure can be prevented so that the transmitting terminal 301 and the receiving terminal 307 can be more reliably paired.

(Step S1414)

The communication unit 316 of the pairing server 313 receives the pairing fix request message 2301 from the receiving terminal 307. Assume that the terminal ID, the first pairing value, and the second pairing value which are included in the received message are ID(R), P1(R), and P2(R), respectively. Afterward, the second determination unit 315d searches the pairing management table 314a for a set of ID(R), P1(R), and P2(R). When the search result shows that the set of ID(R), P1(R), and P2(R) has been stored in the pairing management table 314a (Y in Step S1414), the pairing server 313 then executes the processing of Step S1415. On the other hand, when the set of ID(R), P1(R), and P2(R) has not been stored in the pairing management table 314a (N in Step S1414), the pairing server 313 then executes the processing of Step S1416.

In more detail, even when each of ID(R), P1(R), and P2(R) has been stored in the pairing management table 314a, it is regarded that there is no data, when ID(R), P1(R), and P2(R) are not managed as a set; they have been stored merely independently.

In other words, the second determination unit 315d determines whether or not ID(R), P1(R), and P2(R) have been stored in the pairing management table 314a in such a way that ID(R), P1(R), and P2(R) are associated with one another. Thus, the second determination unit 315d determines whether or not the first pairing value and the second pairing value which are included in the pairing fix request message have been stored in the pairing management table 314a in such a way that the first pairing value and the second paring value are associated with each other, and at the same time, determines whether or not the source of the pairing fix request message is the receiving terminal 307.

(Step S1415)

The pairing unit 315e pairs the receiving terminal 307 and the transmitting terminal 301 when the pairing fix request message which includes the first and the second pairing values stored in the pairing management table 314a in such a way that the first pairing value and the second pairing value are associated with each other has been received from the receiving terminal 307 (Y in Step 1414). For example, the pairing unit 315e rewrites the value of the communication phase in the pairing management table 314a to the value indicating the pairing fixed (e.g., "3"), thereby pairing the receiving terminal 307 and the transmitting terminal 301.

The pairing unit 315e then transmits the pairing fix response message to the receiving terminal 307 via the communication unit 316. The following describes specific processing of transmitting the pairing fix response message.

Figure 24:
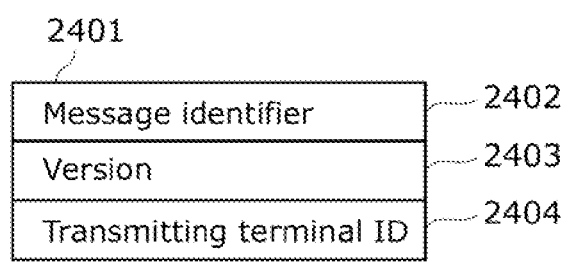
FIG. 24 shows message data included in a pairing fix response message in Embodiment 1 of the present invention.

FIG. 24 shows message data included in the pairing fix response message. A pairing fix response message 2401 includes, as the message data, a message identifier 2402, a version 2403, and transmitting terminal ID 2404.

The message identifier 2402 is message data for identifying the message which is exchanged between the pairing server 313 and the receiving terminal 307. The version 2403 is message data for identifying a version number of the pairing response message. The transmitting terminal ID 2404 is message data indicating the terminal ID of the transmitting terminal 301 paired with the receiving terminal 307.

The pairing unit 315e generates such pairing fix response message 2401. In generating the pairing fix response message 2401, the pairing unit 315e sets "0006" indicating the pairing fix response message, "0100" indicating a default version, and the terminal ID (i.e., "12345ABCDE" in the example of FIG. 18) of the transmitting terminal 301 paired with the receiving terminal 307, respectively, for the message identifier 2402, the version 2403, and the transmitting terminal ID 2404. Afterward, the communication unit 316 transmits the generated pairing fix response message 2401 to the receiving terminal 307.

(Step S1416)

When the first pairing value, the second pairing value, and the terminal ID which are included in the pairing fix response message have not been stored in the pairing management table 314a in such a way that the first pairing value, the second pairing value, and the terminal ID are associated with one another (N in Step 1414), the pairing unit 315e transmits an error message to the receiving terminal 307 via the communication unit 316. In other words, the pairing unit 315e does not pair the transmitting terminal 301 and the receiving terminal 307. The following describes specific processing of transmitting the error message.

The message data included in the error message which is transmitted here is the same or alike as the error message shown in FIG. 20 and therefore is not shown.

The pairing unit 315e generates an error message 2001. In generating the error message 2001, the pairing unit 315e sets "FFFF" indicating an error message, "0100" indicating a default version, and an error code, respectively, for the message identifier 2002, the version 2003, and the error code 2004. It is assumed that the error code is "0003". Afterward, the communication unit 316 transmits the generated error message 2001 to the receiving terminal 307.

(Step S1417)

The communication unit 308 of the receiving terminal 307 receives the message from the pairing server 313. The phase management unit 309 then distinguishes the received message. Here, when the message identifier included in the received message is "0006" indicating the pairing fix response message (Y in Step S1417), the receiving terminal 307 executes the processing of Step S1418 next. When the message identifier included in the received message is "FFFF" indicating the error message (N in Step S1417), the receiving terminal 307 executes the processing of Step S1419 next. Also when the message identifier included in the received message is other than "0004" and "FFFF" (N in Step S1417), the receiving terminal 307 executes the processing of Step S1419 next.

(Step S1418)

The phase management unit 309 holds the transmitting terminal ID included in the received pairing fix response message. FIG. 25 shows an example of data stored in the phase management unit 309. Afterward, the phase management unit 309 displays on the screen an indication that the sharing setup has been completed.

(Step S1419)

The phase management unit 309 displays a processing error indication on the screen and deletes the pairing-related data stored therein.

The description on processing in the pairing check phase ends here.

Through the above processing, the transmitting terminal 301 and the receiving terminal 307 are paired. In this embodiment, the receiving terminal 307 is capable of obtaining the terminal ID of the transmitting terminal 301 (the transmitting terminal ID). Thus, afterward, using the transmitting terminal ID, the receiving terminal 307 is allowed to share, with the transmitting terminal 301, content such as photos and video held by the transmitting terminal 301.

It is to be noted that the transmitting terminal 301 and the receiving terminal 307 may share content in any way as long as they use the result of pairing. For example, the pairing server 313 may control communication between the transmitting terminal 301 and the receiving terminal 307 with reference to the pairing management table 314a in such a way that content such as photos received from the transmitting terminal 301 is transferred to the receiving terminal 307. Furthermore, the pairing server 313 may control communication between the transmitting terminal 301 and the receiving terminal 307 with reference to the pairing management table 314a in such a way that the receiving terminal 307 can download content such as photos uploaded from the transmitting terminal 301.

As above, in the communication control system 300 according to this embodiment, the transmitting terminal 301 and the receiving terminal 307 are paired when the pairing fix request message which includes the first pairing value and the second pairing value is transmitted to the pairing server 313. Thus, when one of the first pairing value and the second pairing value is erroneously transmitted to the pairing server 313, the transmitting terminal 301 and the receiving terminal 307 will merely not be paired; the transmitting terminal 301 or the receiving terminal 307 will not be paired with other terminal which is not intended.

Furthermore, in the communication control system 300 according to this embodiment, the transmitting terminal 301 and the receiving terminal 307 are paired when the pairing request message is received from the receiving terminal 307 and the pairing check request message is received from the transmitting terminal 301. Furthermore, the pairing check request message needs to include the first pairing value transmitted to the receiving terminal 307. In other words, the transmitting terminal 301 and the receiving terminal 307 are paired through the cooperative operation of the transmitting terminal 301 and the receiving terminal 307. Thus, it becomes possible to prevent the transmitting terminal 301 or the receiving terminal 307 from being paired with other terminal which is operated by a malicious user.

Particularly, in this embodiment, the first and the second pairing values generated by the pairing server 313 are transmitted to different terminals (i.e., the transmitting terminal 301 and the receiving terminal 307). This means that there is a stronger necessity for the transmitting terminal 301 and the receiving terminal 307 to operate in cooperation with each other. Thus, it becomes possible to further prevent the transmitting terminal 301 or the receiving terminal 307 from being paired with other terminal which is operated by a malicious user.

Furthermore, in the communication control system 300 according to this embodiment, the second pairing value is generated when it is determined that the second pairing value has not been stored in the pairing management table 314a in such a way that the second pairing value is associated with the first pairing value included in the pairing check request message. Accordingly, when the pairing check request message is received from other terminal which is not intended after the second pairing value is generated, another generation of the second pairing value can be prevented. Thus, it becomes possible to prevent the transmitting terminal 301 or the receiving terminal 307 from being paired with other terminal which is operated by a malicious user when such other terminal transmits the pairing check request message.

Furthermore, in the communication control system 300 according to this embodiment, the transmitting terminal 301 and the receiving terminal 307 are paired when it is determined that the source of the pairing fix request message is the receiving terminal 307. This means that, even when other terminal pretends to be the transmitting terminal 301, the pairing will eventually fail unless the receiving terminal 307 cooperates. Thus, it becomes possible to prevent the transmitting terminal 301 or the receiving terminal 307 from being paired with other terminal which is operated by a malicious user.

Although the pairing unit 315e transmits the pairing fix response message or the error massage to the receiving terminal 307 in Steps S1415 to 1419 in this embodiment, the pairing fix response message or the error massage may be transmitted to the transmitting terminal 301 or both the receiving terminal 307 and the transmitting terminal 301. By so doing, one or both of the transmitting terminal 301 and the receiving terminal 307 can be notified of the result of pairing.

Furthermore, in this embodiment, the transmitting terminal 301 may perform the processing shown in Steps S1413 to S1419, that is, transmission of the pairing fix request message and receiving of the pairing fix response message or the error message. This allows the transmitting terminal 301 to be notified of the result of pairing.

Embodiment 2

Next, Embodiment 2 of the present invention is described.

Figure 26:
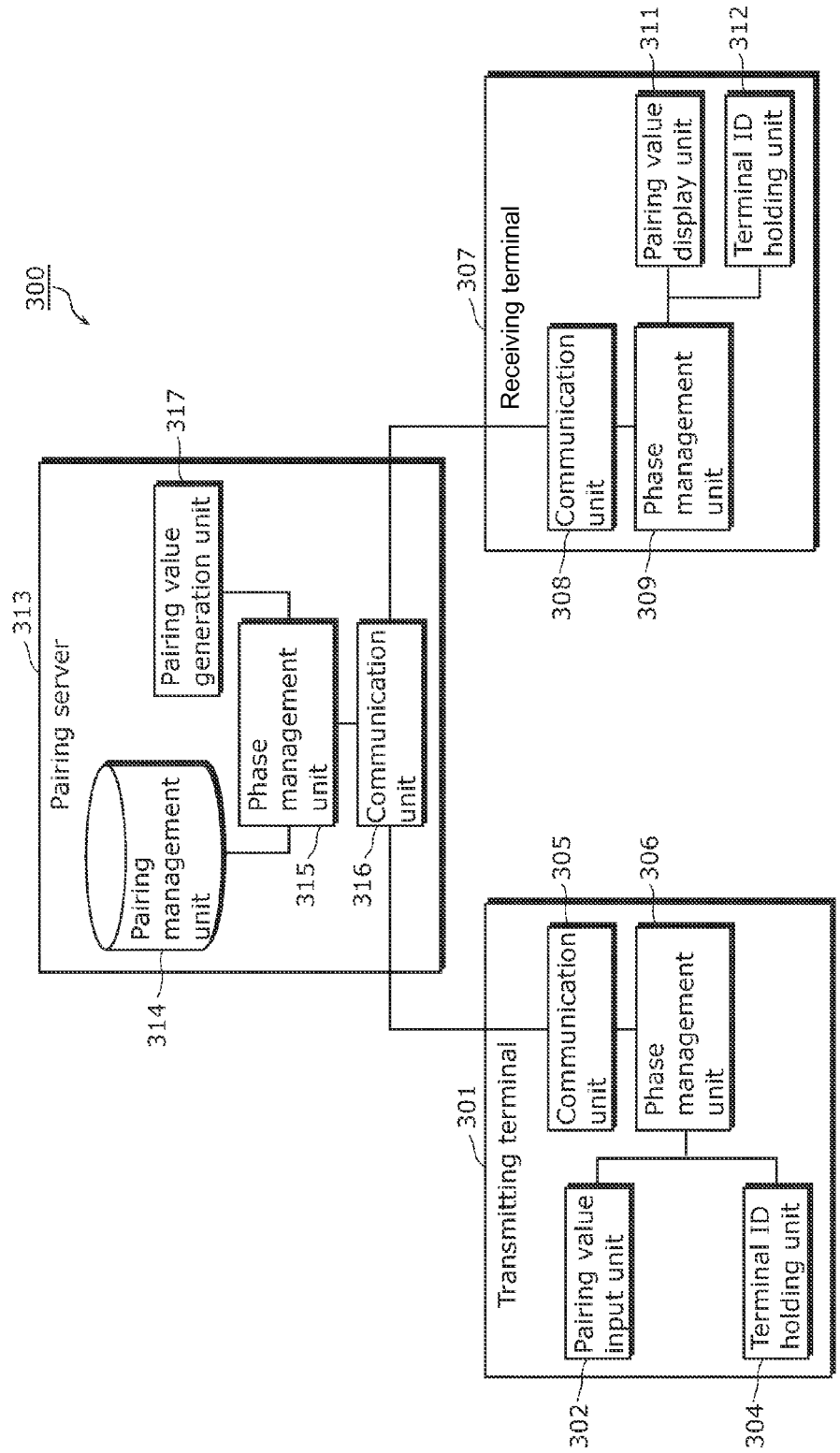
FIG. 26 is a block diagram showing a configuration of a communication control system in Embodiment 2 of the present invention.

FIG. 26 is a block diagram showing a configuration of the communication control system 300 in Embodiment 2 of the present invention. In FIG. 26, constituents which are the same as those in FIG. 3A are denoted by the same numerals and are not described. The block diagram shown in FIG. 26 corresponds to the block diagram shown in FIG. 3A from which the pairing value display unit 303 and the pairing value input unit 310 have been removed.

Figure 27:
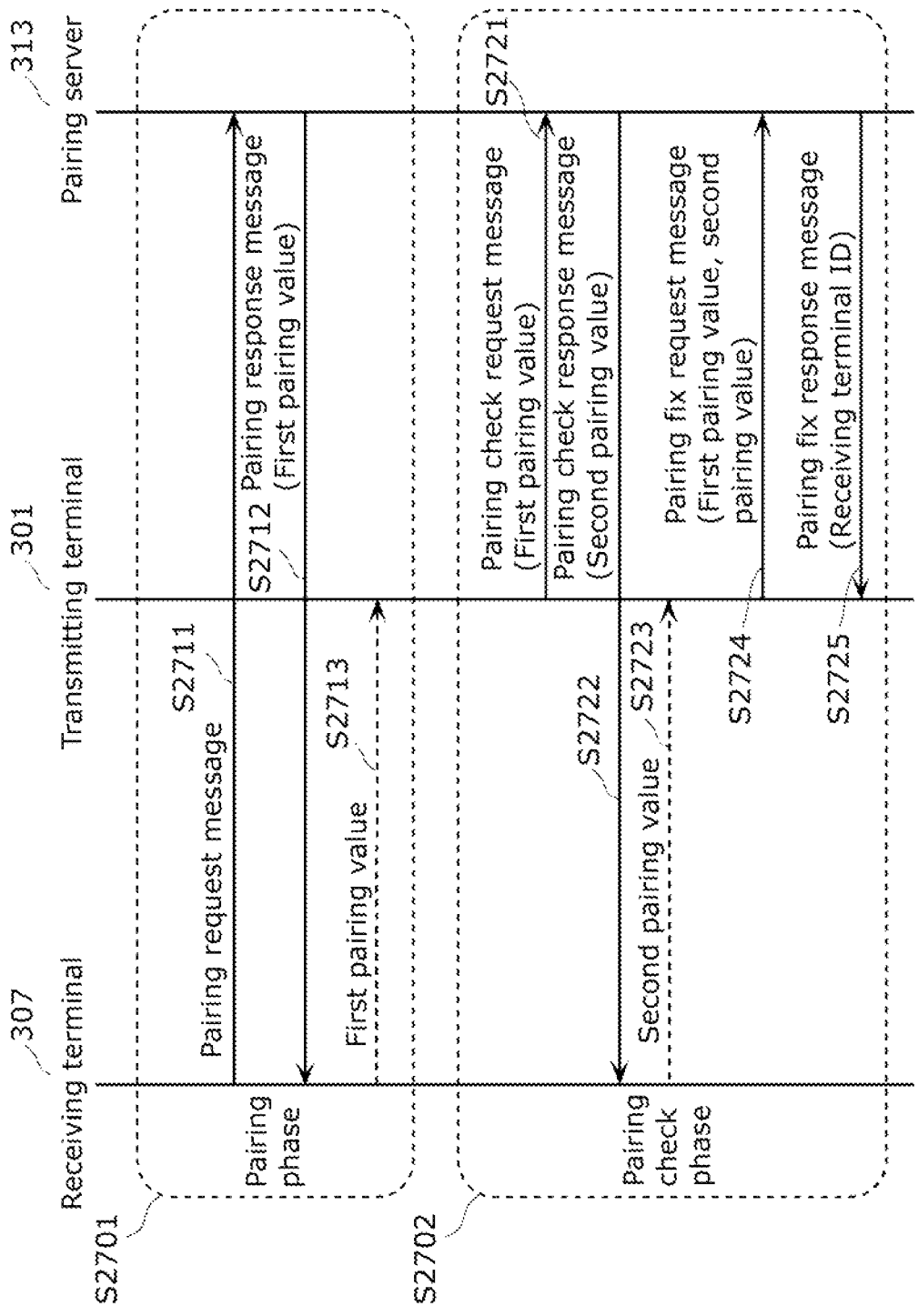
FIG. 27 is a sequence chart for explaining an outline of processing of the communication control system in Embodiment 2 of the present invention.

FIG. 27 is a sequence chart for explaining an outline of processing of the communication control system in Embodiment 2 of the present invention. Specifically, FIG. 27 shows a flow of data exchanged in pairing processing of associating the terminals which share content. The pairing processing includes the pairing phase (Step S2701) and the pairing check phase (Step S2702).

The processing of Steps S2711 to S2713 included in the pairing phase (Step S2701) is the same or alike as the processing of Steps S711 to S713 shown in FIG. 7 and is therefore not described.

In the pairing check phase (Step S2702), the communication unit 305 of the transmitting terminal 301 transmits, to the pairing server 313, a pairing check request message requesting generation of the second pairing value (Step S2721). This pairing check request message corresponds to a second request and includes the first pairing value which has been given.

Here, the second generation unit 317b of the pairing server 313 generates the second pairing value. Furthermore, the second storing unit 315b of the pairing server 313 stores the generated second pairing value into the pairing management table 314a in such a way that the second pairing value is associated with the first pairing value. The second transmitting unit 316a of the pairing server 313 then transmits, to the receiving terminal 307, a pairing check response message which includes the generated second pairing value (Step S2722).

A recipient who operates the receiving terminal 307 notifies, using a notification means such as a telephone, a sender who operates the transmitting terminal 301, of the second pairing value received by the receiving terminal 307 (Step S2723). The communication unit 305 of the transmitting terminal 301 transmits, to the pairing server 313, a pairing fix request message requesting pairing of the transmitting terminal 301 and the receiving terminal 307 (Step S2724). This pairing fix request message corresponds to a third request and includes the first pairing value and the second pairing value.

Lastly, the pairing unit 315e of the pairing server 313 pairs the transmitting terminal 301 and the receiving terminal 307 and transmits, to the transmitting terminal 301, the pairing fix response message which includes the identifier of the receiving terminal 307 (Step S2725).

Thus, the pairing is not completed at the end of the pairing phase (Step S2701), but is completed at the end of the pairing check phase (Step S2702).

Figure 28:
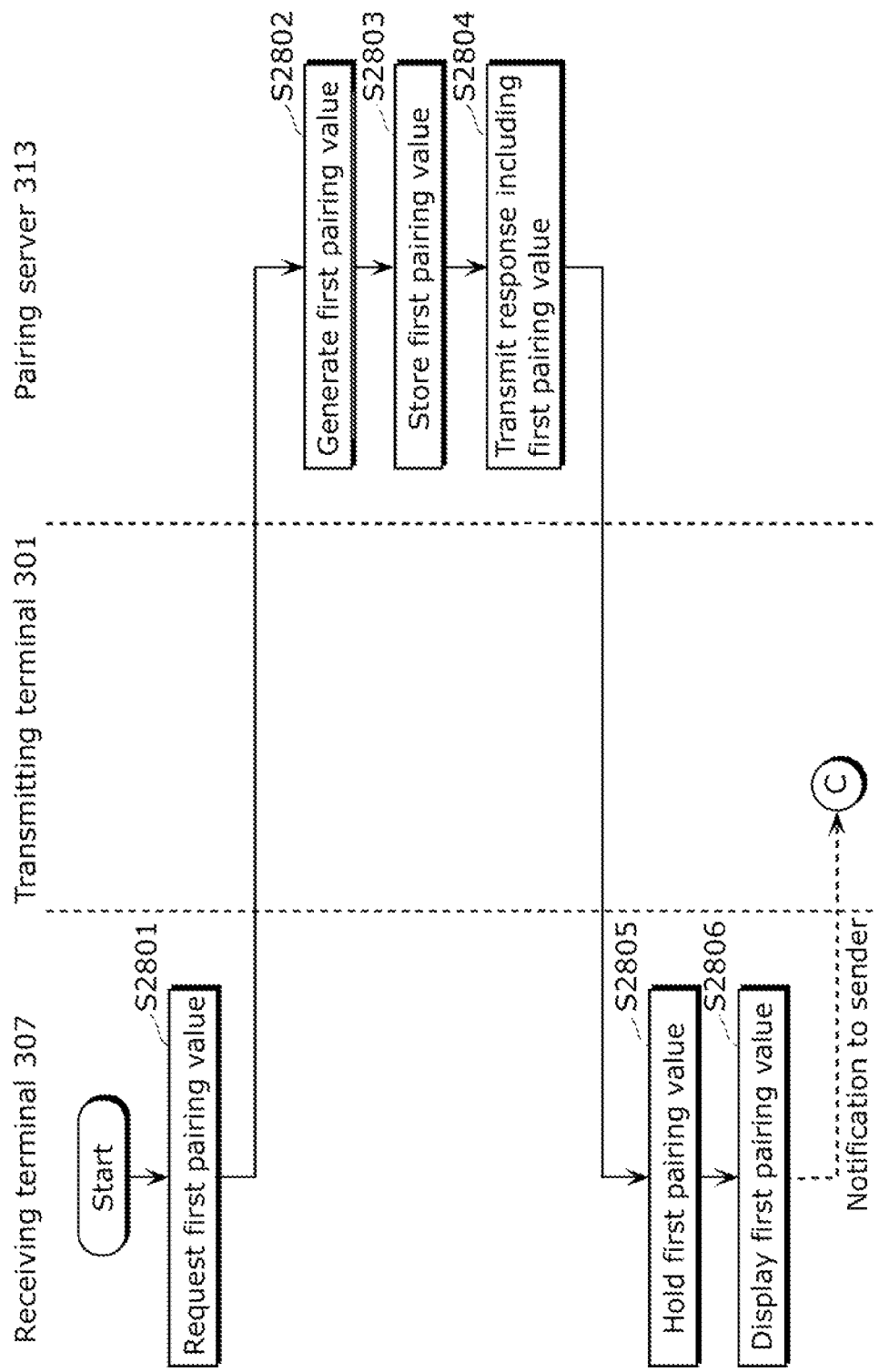
FIG. 28 is a flowchart showing processing in a pairing phase in Embodiment 2 of the present invention.

FIG. 28 is a flowchart showing processing in the pairing phase. In FIG. 28, Steps S2801 to S2805 are the same processing as Steps S801 to S805 in Embodiment 1 of the present invention.

(Step S2806)

Figure 29:
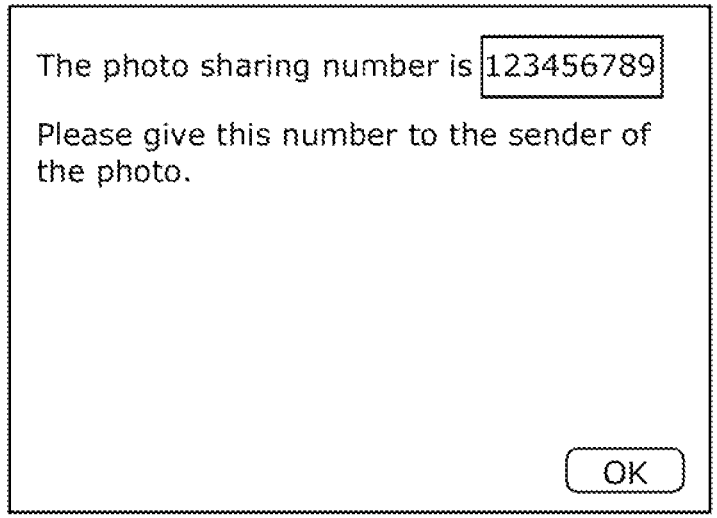
FIG. 29 shows a display example of a first pairing value in a receiving terminal in Embodiment 2 of the present invention.

The phase management unit 309 causes the pairing value display unit 311 of the receiving terminal 307 to display the first pairing value included in the received pairing response message. FIG. 29 shows a display example of the first pairing value. The recipient who operates the receiving terminal 307 notifies the sender of the first pairing value displayed by the pairing value display unit 311. To make notification of the first pairing value, a notifying means which the sender and the recipient use daily may be used. The notifying means includes a telephone, an electronic mail, and a mobile phone electronic mail.

Subsequently, processing in the pairing check phase is described with reference to FIGS. 30A and 30B.

FIGS. 30A and 30B are a flowchart showing the processing in the pairing check phase. In FIG. 30A, Steps S3001 to S3006 are the same processing as Steps S1401 to S1406 in Embodiment 1 of the present invention.

(Step S3007)

The second transmitting unit 316b transmits the pairing check response message to the receiving terminal 307. The following describes specific processing of transmitting the pairing check response message.

Figures 31, 32:
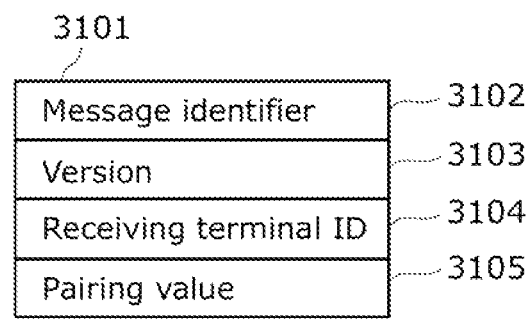
FIG. 31 shows message data included in a pairing check response message in Embodiment 2 of the present invention.
FIG. 32 shows an example of data stored in a phase management unit of the receiving terminal in Embodiment 2 of the present invention.

FIG. 31 shows message data included in the pairing check response message. A pairing check response message 3101 includes, as the message data, a message identifier 3102, a version 3103, transmitting terminal ID 3104, and a pairing value 3105.

The message identifier 3102 is message data for identifying the message which is exchanged between the pairing server 313 and the receiving terminal 307. The version 3103 is message data for identifying a version number of the pairing check response message. The transmitting terminal ID 3104 is message data indicating a value of the transmitting terminal ID managed in association with the terminal ID and the pairing value searched for in Step S3003. The pairing value 3105 is message data indicating the second pairing value generated in Step S3005.

The phase management unit 315 generates such pairing check response message 3101. In generating the pairing check response message 3101, the phase management unit 315 sets "0004" indicating the pairing check response message, "0100" indicating a default version, the ID (i.e., "12345ABCDE" in the example of FIG. 18) of a corresponding transmitting terminal, and the second pairing value "3" generated in Step S3005, respectively, for the message identifier 3102, the version 3103, the transmitting terminal ID 3104, and the pairing value 3105. Afterward, the second transmitting unit 316a transmits the generated pairing check response message 3101 to the receiving terminal 307.

(Step S3008)

When the first pairing value included in the pairing check request message has not been stored in the pairing management table 314a (N in Step S3003) or when the communication phase corresponding to the first pairing value included in the pairing check request message is not the pairing phase (N in Step S3004), the second transmitting unit 316b of the pairing server 313 transmits an error message to the receiving terminal 307. In other words, the second generation unit 317b does not generate the second pairing value. The following describes specific processing of transmitting the error message.

The error message which is transmitted here is the same or alike as the error message shown in FIG. 20 and therefore is not shown nor further described. The phase management unit 315 of the pairing server 313 generates such error message 2001. In generating the error message 2001, the phase management unit 315 sets "FFFF" indicating an error message, "0100" indicating a default version, and the error code, respectively, for the message identifier 2002, the version 2003, and the error code 2004.

The error code is as follows. When there is no data in Step S3003, "0001" is given, and when the value of the communication phase is different in Step S3004 (when the value is "2"), "0002" is given. Afterward, the second transmitting unit 316b transmits the generated error message 2001 to the receiving terminal 307.

(Step S3009)

The communication unit 308 of the receiving terminal 307 receives the message from the pairing server 313. The phase management unit 309 then distinguishes the received message. Here, when the message identifier included in the received message is "0004" indicating the pairing check response message (Y in Step S3009), the receiving terminal 307 executes the processing of Step S3010 next. When the message identifier included in the received message is "FFFF" indicating the error message (N in Step S3009), the receiving terminal 307 executes the processing of Step S3011 next. Also when the message identifier included in the received message is other than "0004" and "FFFF" (N in Step S3009), the receiving terminal 307 executes the processing of Step S3011 next.
(Step S3010)

The phase management unit 309 holds the second pairing value included in the received pairing check response message. FIG. 32 shows an example of data stored in the phase management unit 309. Afterward, the phase management unit 309 causes the pairing value display unit 311 of the receiving terminal 307 to display the second pairing value. FIG. 33 shows a display example of the second pairing value. The recipient who operates the receiving terminal 307 notifies the sender of the second pairing value displayed by the pairing value display unit 311. To make notification of the second pairing value, a notifying means which the sender and the recipient use daily may be used. The notifying means includes a telephone, an electronic mail, and a mobile phone electronic mail.
(Step S3011)

The phase management unit 309 displays a processing error indication on the screen and deletes the pairing-related data stored therein. Afterward, the recipient who operates the receiving terminal 307 notifies the sender that the processing is an error. To make this notification, a notifying means which the sender and the recipient use daily is used. The notifying means includes a telephone, an electronic mail, and a mobile phone electronic mail.
(Step S3012)

Using the pairing value input unit 302, the sender enters, in the transmitting terminal 301, the second pairing value given by the recipient. The second pairing value is entered on the screen shown in FIG. 34. When notified by the recipient that the processing is an error, the sender selects "Cancel". Upon selection of "Cancel", the phase management unit 306 of the transmitting terminal 301 deletes the pairing-related data stored therein.
(Step S3013)

After the second pairing value is entered, the communication unit 305 of the transmitting terminal 301 transmits the pairing fix request message (the third request) to the pairing server 313. The following describes specific processing of transmitting the pairing fix request message.

FIG. 35 shows message data included in the pairing fix request message. A pairing fix request message 3501 includes, as the message data, a message identifier 3502, a version 3503, transmitting terminal ID 3504, a first pairing value 3505, and a second pairing value 3506.

The message identifier 3502 is message data for identifying the message which is exchanged between the pairing server 313 and the transmitting terminal 301. The version 3503 is message data for identifying a version number of the pairing request message. The transmitting terminal ID 3504 is message data indicating the terminal ID of the transmitting terminal 301 that is a terminal which transmits the pairing fix request message. The first pairing value 3505 is message data indicating the first pairing value. The second pairing value 3506 is message data indicating the second pairing value.

The phase management unit 306 of the transmitting terminal 301 generates such pairing fix request message 3501. In generating the pairing fix request message 3501, the phase management unit 309 sets "0005" indicating the pairing fix request message, "0100" indicating a default version, the terminal ID held by the terminal ID holding unit 304, the first pairing value stored in the phase management unit 306, and the second pairing value entered in Step S3011, respectively, for the message identifier 3502, the version 3503, the transmitting terminal ID 3504, the first pairing value 3505, and the second pairing value 3506. Afterward, the communication unit 305 transmits the generated pairing fix request message 3501 to the pairing server 313.

It is to be noted that whether to transmit this pairing fix request message is managed by the phase management unit 306. Specifically, before the communication unit 305 transmits the pairing fix request message to the pairing server 313, the phase management unit 306 determines whether or not the pairing check request message which includes the first pairing value included in that pairing fix request message has already been transmitted to the pairing server 313. Here, when the pairing check request message which includes the first pairing value has not yet been transmitted to the pairing server 313, the phase management unit 306 prohibits the communication unit 305 from transmitting, to the pairing server 313, the pairing fix request message which includes that first pairing value.

This allows the transmitting terminal 301 to be prevented from transmitting, to the pairing server 313, the pairing fix request message which includes the first pairing value that has not been transmitted to the pairing server 313. In other words, the transmission of the pairing fix request message to the pairing server 313 in an erroneous procedure can be prevented so that the transmitting terminal 301 and the receiving terminal 307 can be more reliably paired.
(Step S3014)

The communication unit 316 of the pairing server 313 receives the pairing fix request message 3501 from the transmitting terminal 301. Assume that the terminal ID, the first pairing value, and the second pairing value which are included in the received message are ID(S), P1(S), and P2(S), respectively. Afterward, the second determination unit 315d searches the pairing management table 314a for a set of ID(S), P1(S), and P2(S). When the search result shows that the set of ID(S), P1(S), and P2(S) has been stored in the pairing management table 314a (Y in Step S3014), the pairing server 313 then executes the processing of Step S3015. When the set of ID(S), P1(S), and P2(S) has not been stored in the pairing management table 314a (N in Step S3014), the pairing server 313 then executes the processing of Step S3016.

In more detail, even when each of ID(S), P1(S), and P2(S) has been stored in the pairing management table 314a, it is regarded that there is no data, when ID(S), P1(S), and P2(S) are not managed as a set; they have been stored merely independently.

In other words, the second determination unit 315d determines whether or not ID(S), P1(S), and P2(S) have been stored in the pairing management table 314a in such a way that ID(S), P1(S), and P2(S) are associated with one another. Thus, the second determination unit 315d determines whether or not the first pairing value and the second pairing value which are included in the pairing fix request message have been stored in the pairing management table 314a in such a way that the first pairing value and the second pairing value are associated with each other, and at the same time, determines whether or not the source of the pairing fix request message is the transmitting terminal 301.
(Step S3015)

The pairing unit 315e pairs the receiving terminal 307 and the transmitting terminal 301 when the pairing fix request message which includes the first and the second pairing values stored in the pairing management table 314a in such a way that the first pairing value and the second pairing value are associated with each other has been received (Y in Step 3014). In this embodiment, the pairing unit 315e transmits the pairing fix response message to the transmitting terminal 301 via the communication unit 316. The following describes specific processing of transmitting the pairing fix response message.

Figures 36, 37:
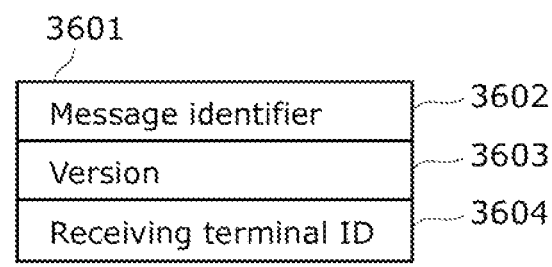
FIG. 36 shows message data included in a pairing fix response message in Embodiment 2 of the present invention.
FIG. 37 shows an example of data stored in a phase management unit of the transmitting terminal in Embodiment 2 of the present invention.

FIG. 36 shows message data included in the pairing fix response message. A pairing fix response message 3601 includes, as the message data, a message identifier 3602, a version 3603, and receiving terminal ID 3604.

The message identifier 3602 is message data for identifying the message which is exchanged between the pairing server 313 and the transmitting terminal 301. The version 3603 is message data for identifying a version number of the pairing response message. The receiving terminal ID 3604 is message data indicating the terminal ID of the receiving terminal 307 paired with the transmitting terminal 301.

The pairing unit 315e generates such pairing fix response message 3601. In generating the pairing fix response message 3601, the pairing unit 315e sets "0006" indicating the pairing fix response message, "0100" indicating a default version, and the terminal ID (i.e., "112233EEFF" in the example of FIG. 18) of the receiving terminal of which pairing has been fixed, respectively, for the message identifier 3602, the version 3603, and the receiving terminal ID 3604. Afterward, the communication unit 316 transmits the generated pairing fix response message 3601 to the transmitting terminal 301.
(Step S3016)

When the first pairing value, the second pairing value, and the terminal ID which are included in the pairing fix request message have not been stored in the pairing management table 314a in such a way that the first pairing value, the second pairing value, and the terminal ID are associated with one another (N in Step 3014), the pairing unit 315e transmits an error message to the receiving terminal 301 via the communication unit 316. In other words, the pairing unit 315e does not pair the transmitting terminal 301 and the receiving terminal 307. The following describes specific processing of transmitting the error message.

The message data included in the error message which is transmitted here is the same or alike as the error message shown in FIG. 20 and therefore is not shown.

The pairing unit 315e generates an error message 2001. In generating the error message 2001, the pairing unit 315e sets "FFFF" indicating an error message, "0100" indicating a default version, and an error code, respectively, for the message identifier 2002, the version 2003, and the error code 2004. It is assumed that the error code is "0003". Afterward, the communication unit 316 transmits the generated error message 2001 to the transmitting terminal 301.
(Step S3017)

The communication unit 305 of the transmitting terminal 301 receives the message from the pairing server 313. The phase management unit 306 then distinguishes the received message. Here, when the message identifier included in the received message is "0006" indicating the pairing fix response message (Y in Step S3017), the transmitting terminal 301 executes the processing of Step S3018 next. When the message identifier included in the received message is "FFFF" indicating the error message (N in Step S3017), the transmitting terminal 301 executes the processing of Step S3019 next. Also when the message identifier included in the received message is other than "0004" and "FFFF" (N in Step S3017), the transmitting terminal 301 executes the processing of Step S3019 next.
(Step S3018)

The phase management unit 306 holds the receiving terminal ID included in the received pairing fix response message. FIG. 37 shows an example of data stored in the phase management unit 306. Afterward, the phase management unit 306 displays on the screen that the sharing setup has been completed.
(Step S3019)

The phase management unit 306 displays a processing error indication on the screen and deletes the pairing-related data stored therein.

The description on processing in the pairing check phase ends here.

Through the above processing, the transmitting terminal 301 and the receiving terminal 307 are paired. In this embodiment, the transmitting terminal 301 is capable of obtaining the terminal ID of the receiving terminal 307 (the receiving terminal ID). Thus, afterward, using the receiving terminal ID, the transmitting terminal 301 is allowed to share, with the receiving terminal 307, content such as photos and video held by the transmitting terminal 301.

As above, in the communication control system 300 according to this embodiment, the transmitting terminal 301 and the receiving terminal 307 are paired when the pairing fix request message which includes the first pairing value and the second pairing value is transmitted to the pairing server 313, as in the case of the communication control system 300 according to Embodiment 1. Thus, when one of the first pairing value and the second pairing value is erroneously transmitted to the pairing server 313, the transmitting terminal 301 and the receiving terminal 307 will merely not be paired; the transmitting terminal 301 or the receiving terminal 307 will not be paired with other terminal which is not intended.

Furthermore, in the communication control system 300 according to this embodiment, the transmitting terminal 301 and the receiving terminal 307 are paired when the pairing request message is received from the receiving terminal 307 and the pairing check request message is received from the transmitting terminal 301. Furthermore, the pairing check request message needs to include the first pairing value transmitted to the receiving terminal 307. In other words, the transmitting terminal 301 and the receiving terminal 307 are paired through the cooperative operation of the transmitting terminal 301 and the receiving terminal 307. Thus, it becomes possible to prevent the transmitting terminal 301 or the receiving terminal 307 from being paired with other terminal which is operated by a malicious user.

Particularly, in this embodiment, the first and the second pairing values generated by the pairing server 313 are both transmitted to the receiving terminal 307. This means that the recipient who operates the receiving terminal 307 does not need to enter the second pairing value in the receiving terminal 307, which allows a reduction in the load on the recipient to operate the receiving terminal 307.

Furthermore, in the communication control system 300 according to this embodiment, the transmitting terminal 301 and the receiving terminal 307 are paired when it is determined that the source of the pairing check request message is the transmitting terminal 301. In other words, the transmitting terminal 301 is not paired with the receiving terminal 307 unless the transmitting terminal 301 receives the second pairing value from the receiving terminal 307 which transmitted that second pairing value. Thus, it becomes possible to prevent the transmitting terminal 301 or the receiving terminal 307 from being paired with other terminal which is operated by a malicious user.

Although the pairing unit 315e transmits the pairing fix response message or the error massage to the transmitting terminal 301 in Steps S3015 to S3019 in this embodiment, the pairing fix response message or the error massage may be transmitted to the receiving terminal 307 or both the receiving terminal 307 and the transmitting terminal 301. By so doing, one or both of the transmitting terminal 301 and the receiving terminal 307 can be notified of the result of pairing.

Furthermore, in this embodiment, the receiving terminal 307 may perform the processing shown in Steps S3013 to S3019, that is, transmission of the pairing fix request message and receiving of the pairing fix response message or the error message. This allows the receiving terminal 307 to be notified of the result of pairing.

Embodiment 3

Figure 38:
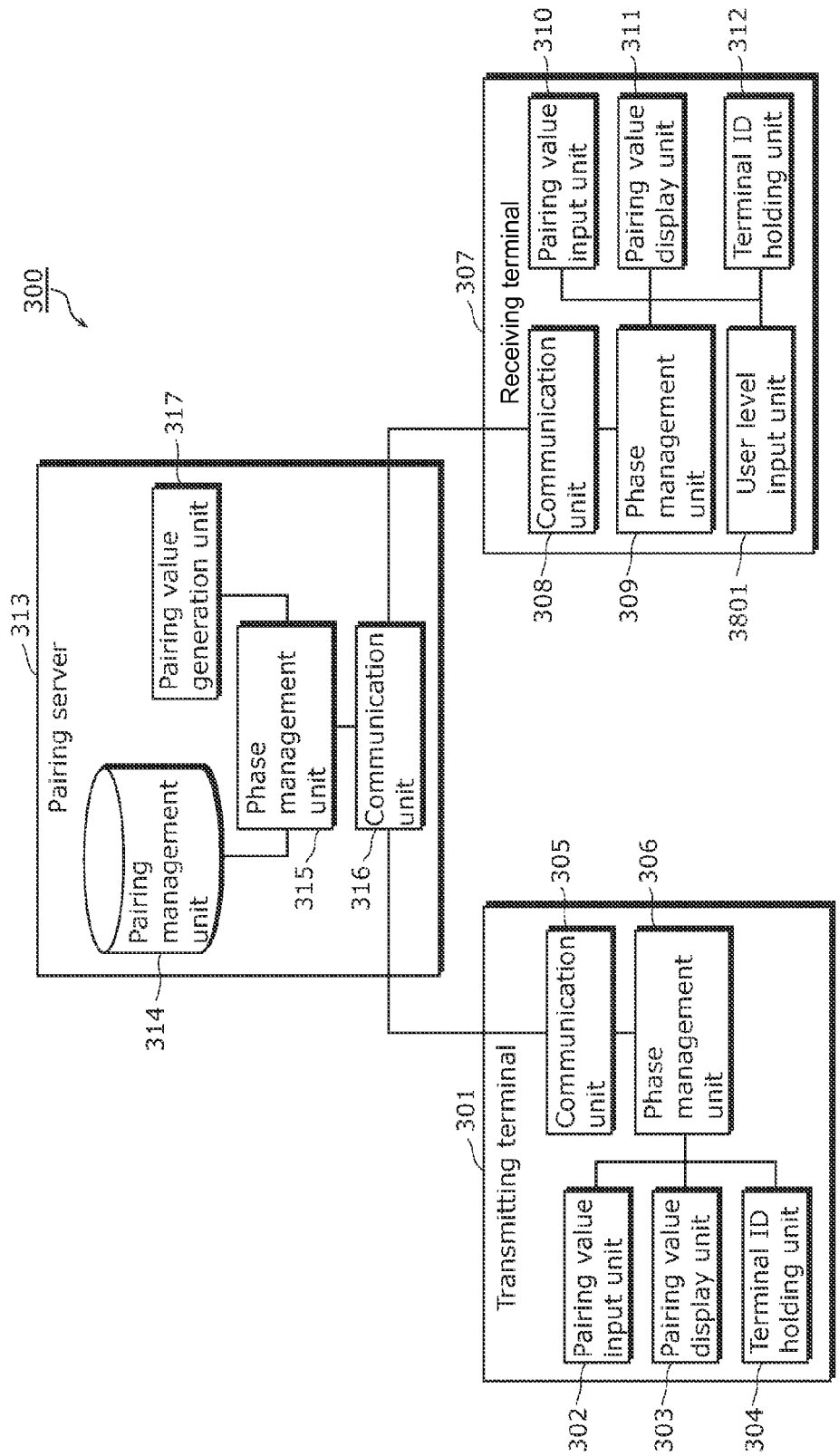
FIG. 38 is a block diagram showing a configuration of a communication control system in Embodiment 3 of the present invention.

Next, Embodiment 3 of the present invention is described.
FIG. 38 is a block diagram showing a configuration of the communication control system 300 in Embodiment 3 of the present invention. In FIG. 38, constituents which are the same as those in FIG. 3A are denoted by the same numerals and are not described. The block diagram shown in FIG. 38 corresponds to the block diagram shown in FIG. 3A to which a user level input unit 3801 has been added.

The user level input unit 3801 receives an input of level information (hereinafter referred to as "user level") from the recipient who operates the receiving terminal 307. Specifically, the user level input unit 3801 is an input circuit implemented as a key board, a touch panel, or a remote control device, for example.

It is to be noted that the user level is a level indicating a skill of a user using an input device. Here, the user level indicates a level of the operation skill of the recipient who operates the receiving terminal 307. For example, the user level has three stages "Beginner", "Standard", and "Advanced" which are assigned with level values "1", "2", and "3", respectively.

FIG. 39 shows an example of the pairing management table 314a stored in the pairing management unit 314. As shown in FIG. 39, the pairing management table 314a includes receiving terminal ID 3901, transmitting terminal ID 3902, a communication phase 3903, a first pairing value 3904, a second pairing value 3905, and a user level 3906.

It is to be noted that the receiving terminal ID 3901, the transmitting terminal ID 3902, the communication phase 3903, the first pairing value 3904, and the second pairing value 3905 which are shown in FIG. 39 are the same or alike as the receiving terminal ID 601, the transmitting terminal ID 602, the communication phase 603, the first pairing value 604, and the second pairing value 605, respectively, which are shown in FIG. 6, and are therefore not described.

In the user level 3906, a user level value received from the receiving terminal 307 via the communication unit 316 is stored. In FIG. 39, a blank column indicates that still no value is stored.

Next, various operations in the communication control system 300 configured as above are specifically described.

Figure 40:
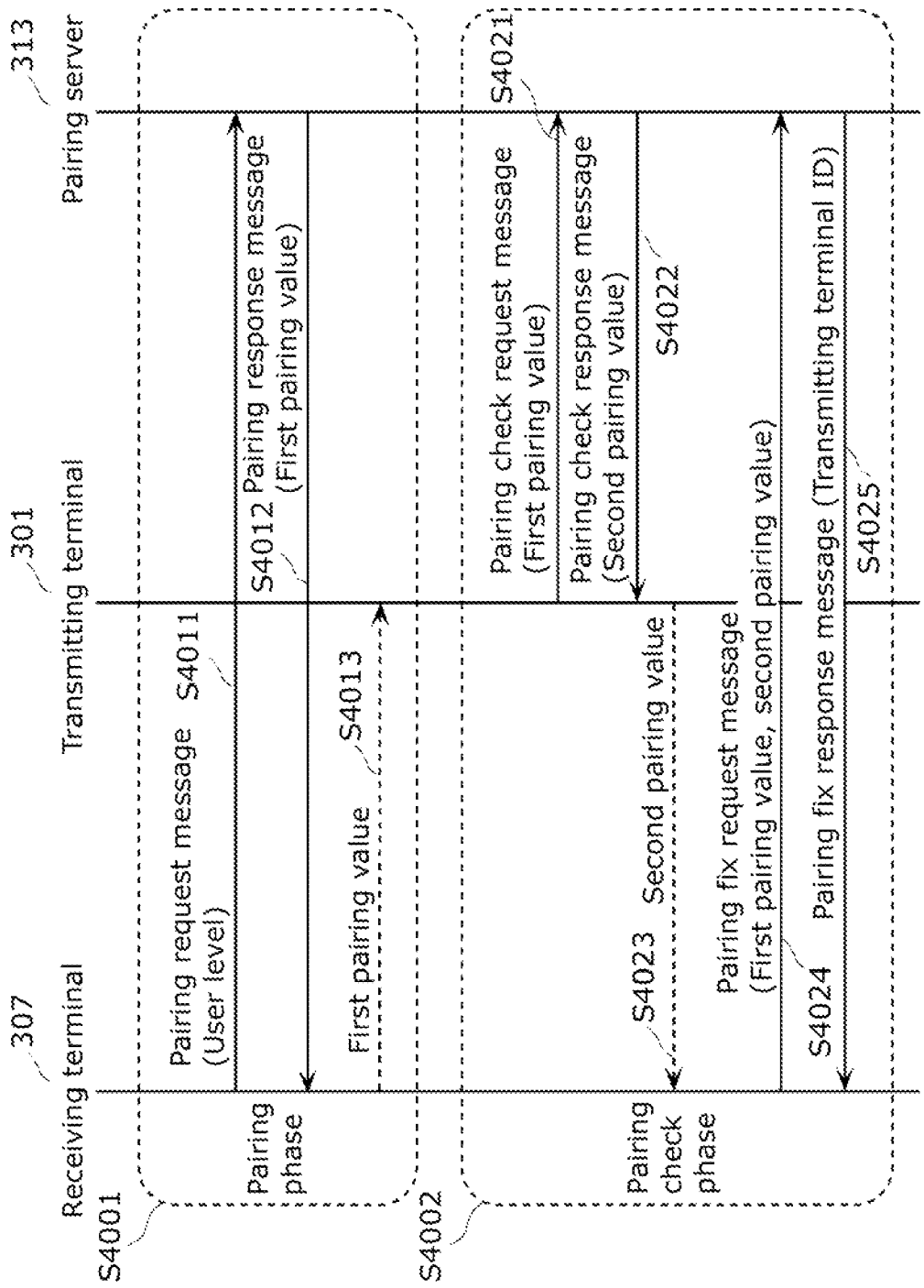
FIG. 40 is a sequence chart for explaining an outline of processing of the communication control system in Embodiment 3 of the present invention.

FIG. 40 is a sequence chart for explaining an outline of processing of the communication control system 300 in Embodiment 3 of the present invention. Specifically, FIG. 40 shows a flow of communication data in pairing processing of associating the terminals which share content. The pairing processing includes the pairing phase (Step S4001) and the pairing check phase (Step S4002).

First, the communication unit 308 of the receiving terminal 307 transmits, to the pairing server 313, a pairing request message requesting generation of the first pairing value (Step S4011). This pairing request message corresponds to a first request and includes the user level.

Here, the first generation unit 317a of the pairing server 313 generates the first pairing value such that the degree of complexity of the first pairing value increases as the level indicated by the user level decreases. In this embodiment, the degree of complexity of the pairing value changes with the number of digits of the pairing value. This means that the degree of complexity of the pairing value increases as the number of digits of the pairing value increases.

It is to be noted that the degree of complexity of the pairing identifier does not always need to change with the number of digits. For example, the degree of complexity of the pairing identifier may change with the number of types of characters included in the pairing identifier. Furthermore, the degree of complexity of the pairing identifier may change with a combination of the number of digits and the number of types of characters.

Next, the first storing unit 315a of the pairing server 313 stores the generated first pairing value into the pairing management table 314a. The first transmitting unit 316a of the pairing server 313 then transmits, to the receiving terminal 307, a pairing response message which includes the generated first pairing value (Step S4012).

A recipient who operates the receiving terminal 307 notifies, using a notification means such as a telephone, a sender who operates the transmitting terminal 301, of the first pairing value received by the receiving terminal 307 (Step S4013).

Next, the communication unit 305 of the transmitting terminal 301 transmits, to the pairing server 313, a pairing check request message requesting generation of the second pairing value (Step S4021). This pairing check request message corresponds to a second request and includes the first pairing value which has been given.

Here, the second generation unit 317b of the pairing server 313 generates the second pairing value such that the degree of complexity of the second pairing value decreases as the level indicated by the user level received in Step S4011 decreases. Furthermore, the second storing unit 315b of the pairing server 313 stores the generated second pairing value into the pairing management table 314a in such a way that the second pairing value is associated with the first pairing value. The second transmitting unit 316b of the pairing server 313 then transmits, to the transmitting terminal 301, a pairing check response message which includes the generated second pairing value (Step S4022).

It is to be noted that the subsequent Steps S4023 to S4025 are the same or alike as Steps S723 to S725 shown in FIG. 7 and are therefore not described.

Thus, in this embodiment, the degree of complexity of the first pairing value and the degree of complexity of the second pairing value are different depending on the operation skill of the recipient. As in the case of Embodiment 1, the pairing is not completed in the pairing phase, but is completed at the end of the pairing check phase in this embodiment as well.

Figure 41:
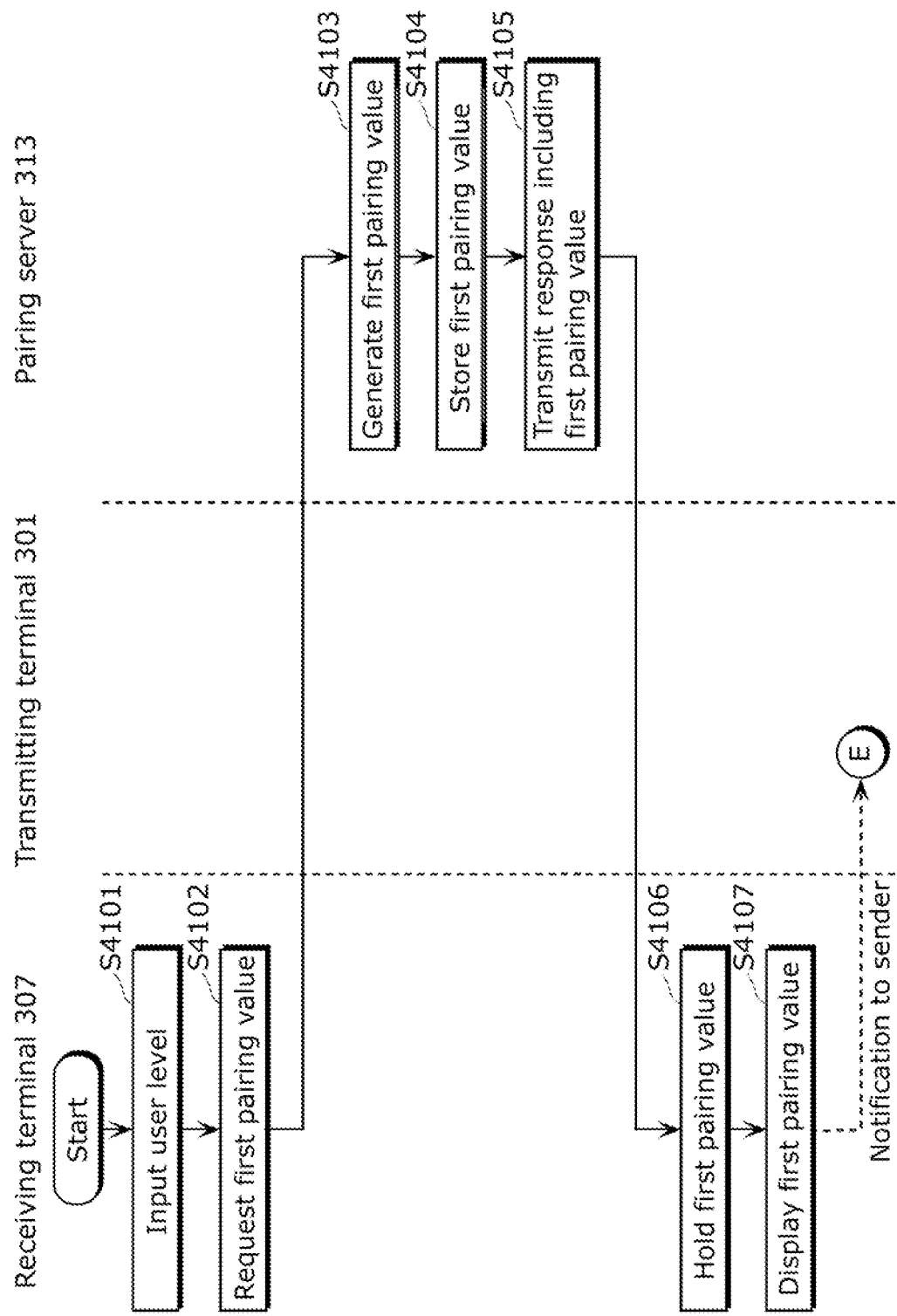
FIG. 41 is a flowchart showing processing in a pairing phase in Embodiment 3 of the present invention.

FIG. 41 is a flowchart showing processing in the pairing phase. With reference to FIG. 41, various processing in the pairing phase is described.
(Step S4101)

Figure 42:
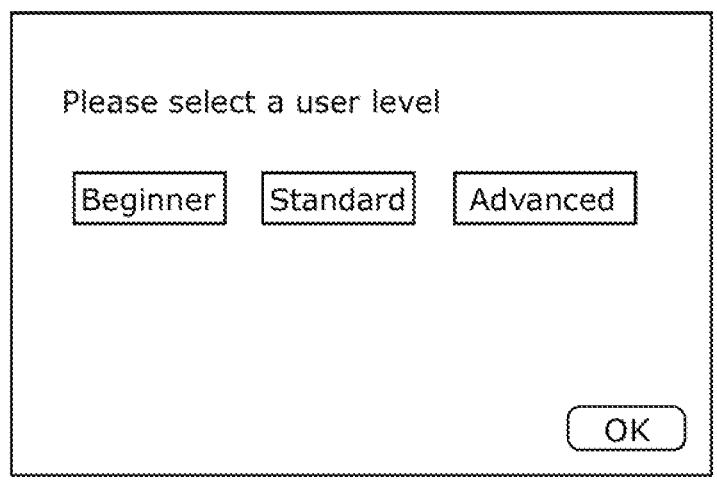
FIG. 42 shows an example of a screen for entering a user level in Embodiment 3 of the present invention.

The recipient enters his or her own user level using the user level input unit 3801. The recipient selects "sharing setup (receiving)" menu on the menu screen of the receiving terminal 307. Upon selection of "sharing setup (receiving)" menu, a user level input screen shown in FIG. 42 is displayed on the screen. The user enters the user level on the user level input screen. In other words, the user level input unit 3801 receives an input of the user level from the recipient.
(Step S4102)

According to an instruction of the recipient, the receiving terminal 307 transmits the pairing request message (the first request) to the pairing server 313. The following describes specific processing of transmitting the pairing request message.

Figure 43:
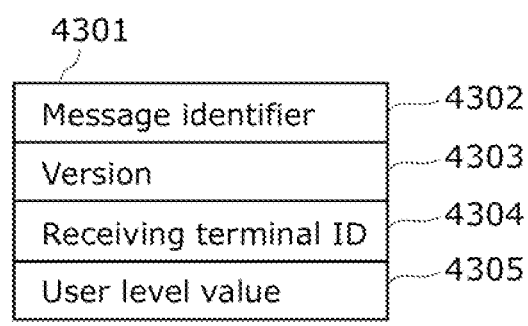
FIG. 43 shows message data included in a pairing request message in Embodiment 3 of the present invention.

FIG. 43 shows message data included in the pairing request message. A pairing request message 4301 includes, as the message data, a message identifier 4302, a version 4303, receiving terminal ID 4304, and a user level value 4305.

The message identifier 4302, the version 4303, and the receiving terminal ID 4304 are the same or alike as the message identifier 902, the version 903, and the receiving terminal ID 904, respectively, which are shown in FIG. 9, and are therefore not described. The user level value 4305 is a value indicating a level of the operation skill of the recipient. For the user level value 4305, a value is set which corresponds to the user level received by the user level input unit 3801.

The recipient selects "sharing setup (receiving)" menu on the menu screen of the receiving terminal 307. Upon selection of "sharing setup (receiving)" menu, the phase management unit 309 of the receiving terminal 307 generates such pairing request message 4301. In generating the pairing request message 4301, the phase management unit 309 sets "0001" indicating the pairing request message, "0100" indicating a default version, the terminal ID held by the terminal ID holding unit 312, and a numerical value corresponding to the user level entered by a user in Step S4101, respectively, for the message identifier 4302, the version 4303, the receiving terminal ID 4304, and the user level value. Afterward, the communication unit 308 transmits the generated pairing request message 4301 to the pairing server 313.

(Step S4103)

The first generation unit 317a of the pairing server 313 generates the first pairing value when the pairing request message 4301 is received from the receiving terminal 307. The first pairing value is generated according to the user level value included in the pairing request message 4301. Specifically, the first generation unit 317a generates a random number of nine digits as the first pairing value when the user level value is "1" (Beginner). The first generation unit 317a generates a random number of five digits as the first pairing value when the user level value is "2" (Standard). The first generation unit 317a generates a random number of one digit as the first pairing value when the user level value is "3" (Advanced). In this embodiment, assume that the first pairing value is a random number of five digits "12345".

(Step S4104)

The first storing unit 315a of the phase management unit 315 stores, into the pairing management table 314a, a phase number, the receiving terminal ID included in the received pairing request message 901, and the first pairing value generated in Step S802, in such a way that the phase number, the receiving terminal ID, and the first pairing value are associated with one another. In the phase number, "1" indicating the pairing phase is stored.

FIG. 44 shows an example of the pairing management table 314a at the end of Step S803. In FIG. 44, the columns for the transmitting terminal ID and the second pairing value are blank because the transmitting terminal ID and the second pairing value are still not set.

(Steps S4105 to S4107)

Figure 45:
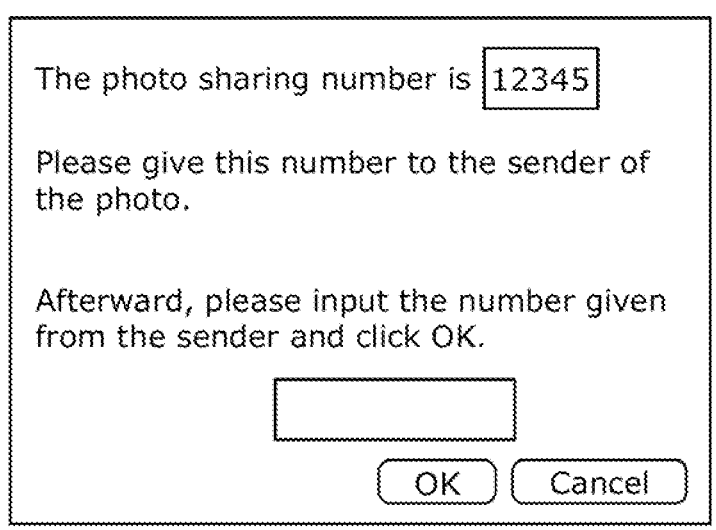
FIG. 45 shows a display example of a first pairing value in a receiving terminal in Embodiment 3 of the present invention.

Processing which is the same as in Steps S804 to S806 in Embodiment 1 of the present invention is performed. FIG. 45 shows a display example of the first pairing value.

The description on processing in the pairing phase ends here.

Subsequently, processing in the pairing check phase is described with reference to FIGS. 46A and 46B.

Figure 46A:
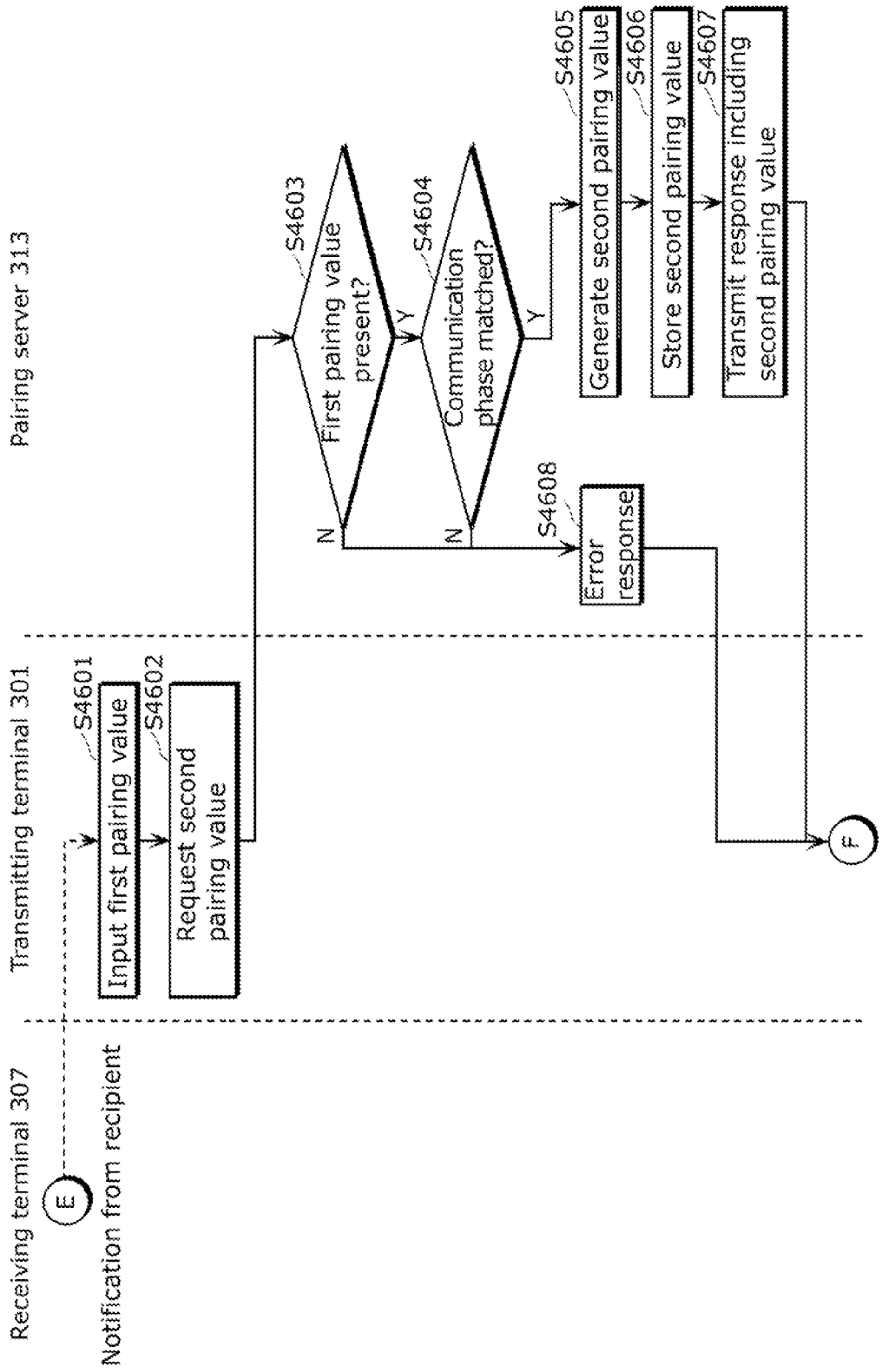
FIG. 46A is a flowchart showing processing in a pairing check phase in Embodiment 3 of the present invention.

FIGS. 46A and 46B are a flowchart showing the processing in the pairing check phase.

(Steps S4601 to S4604)

Processing which is the same as in Steps S1401 to S1404 in Embodiment 1 of the present invention is performed. FIG. 47 shows an example of data stored in the phase management unit 309. In FIG. 47, the column for the second pairing value is blank because notification of the second pairing value has not been made.

(Step S4605)

The second generation unit 317b generates the second pairing value. The second pairing value is generated according to the user level value stored in the pairing management table 314a. Specifically, the second generation unit 317b generates a random number of one digit as the second pairing value when the user level value is "1" (Beginner). The second generation unit 317b generates a random number of five digits as the second pairing value when the user level value is "2" (Standard). The second generation unit 317b generates a random number of nine digits as the second pairing value when the user level value is "3" (Advanced). In this embodiment, assume that the second pairing value is a random number of five digits "67890".

(Step S4606)

The second storing unit 315b stores, into the pairing management table 314a, the transmitting terminal ID included in the received pairing check request message 1701 and the second pairing value generated in Step S4605. At this time, the second storing unit 315b rewrites the phase number from "1" indicating the pairing phase to "2" indicating the pairing check phase.

FIG. 48 shows an example of the pairing management table 314a at the end of Step S4606.

(Steps S4607 to S4619)

Figure 50:
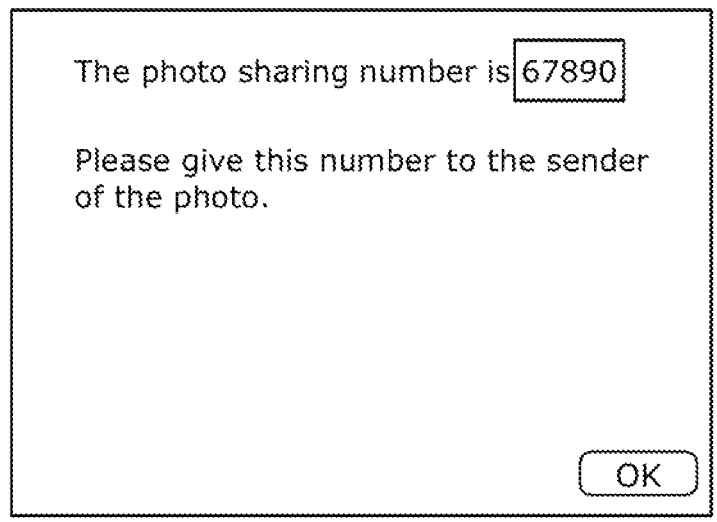
FIG. 50 shows a display example of a second pairing value in the transmitting terminal in Embodiment 3 of the present invention.

Processing which is the same as in Steps S1407 to S1419 in Embodiment 1 of the present invention is performed. FIG. 49 shows an example of data stored in the phase management unit 306. FIG. 50 shows a display example of the second pairing value which the phase management unit 306 of the transmitting terminal 301 causes the pairing value display unit 303 to display. FIG. 51 shows an example of data stored in the phase management unit 309.

The description on processing in the pairing check phase ends here.

Through the above processing, the receiving terminal 307 is capable of obtaining the terminal ID of the transmitting terminal 301 (the transmitting terminal ID) in this embodiment where the transmitting terminal 301 and the receiving terminal 307 are paired. Thus, afterward, using the transmitting terminal ID, the receiving terminal 307 is allowed to share, with the transmitting terminal 301, content such as photos and video held by the transmitting terminal 301.

As above, in the communication control system 300 according to this embodiment, it is possible to generate the second pairing value such that the degree of complexity of the second pairing value decreases as the user level decreases. Thus, according to the operation skill of the recipient who operates the receiving terminal 307, the load on the recipient to operate the receiving terminal 307 can be reduced. An erroneous input of the second pairing value by the recipient can therefore be prevented so that the transmitting terminal 301 and the receiving terminal 307 can be more reliably paired.

Furthermore, in the communication control system 300 according to this embodiment, it is possible to increase the degree of complexity of the first pairing value when the degree of complexity of the second pairing value decreases.

Thus, an excessive decrease in the degree of complexity of the whole values, that is, a combination of the first pairing value and the second pairing value, can be prevented. Accordingly, the security deterioration can be prevented while the erroneous input of the pairing value by a user can be prevented.

Although the pairing unit 315e transmits the pairing fix response message or the error massage to the receiving terminal 307 in Steps S4515 to 4519 in this embodiment, the pairing fix response message or the error massage may be transmitted to the transmitting terminal 301 or both the receiving terminal 307 and the transmitting terminal 301. By so doing, one or both of the transmitting terminal 301 and the receiving terminal 307 can be notified of the result of pairing.

Furthermore, in this embodiment, the transmitting terminal 301 may perform the processing shown in Steps S4513 to S4519, that is, transmission of the pairing fix request message and receiving of the pairing fix response message or the error message. This allows the transmitting terminal 301 to be notified of the result of pairing.

Furthermore, although the degree of complexity of each of the first pairing value and the second pairing value is different depending on the user level in this embodiment, it may also be possible that the degree of complexity of one of the first pairing value and the second pairing value is different depending on the user level.

Although the communication control system 300 according to an implementation of the present invention has been described above based on the embodiments, the present invention is not limited to these embodiments. Without departing from the scope of the present invention, the present invention includes an embodiment with some modifications on Embodiments that are conceived by a person skilled in the art, or an embodiment obtained through combinations of the constituents of different Embodiments.

For example, in Embodiments 1 to 3 described above, the communication between the transmitting terminal 301 and the pairing server 313 and the communication between the receiving terminal 307 and the pairing server 313 may each use a secure authenticated channel such as secure sockets layer (SSL). This leads to security improvement in the communication between the transmitting terminal 301 or the receiving terminal 307 and the pairing server 313 so that an identity theft of a terminal and a leakage of a pairing value in the communication path can be prevented.

Furthermore, in Embodiments 1 to 3 described above, the pairing server 313 may return an error message when receiving no pairing check request messages within a predetermined period of time after transmitting a pairing response message. In other words, the second generation unit 317b may generate the second pairing value when the pairing check request message is received within the predetermined period of time after the pairing response message is transmitted. Likewise, the pairing server 313 may return an error message when receiving no pairing fix request messages within a predetermined period of time after transmitting a pairing check response message. In other words, the pairing unit 315e may pair the transmitting terminal 301 and the receiving terminal 307 when receiving the pairing fix request message within the predetermined period of time after transmitting the pairing check response message. By so doing, erroneous pairing of the terminals due to, for example, an attack by a malicious user terminal can be prevented.

Furthermore, in Embodiments 1 to 3 described above, the pairing server 313 may restrict receiving of a message from a terminal when error messages have been transmitted to the terminal a predetermined number of times or more in response to the pairing request message, the pairing check request message, or the pairing fix request message. Specifically, the pairing server 313 may be set not to receive messages from that terminal at all or within a predetermined period of time. By so doing, an increase in the load of communication processing on the pairing server 313 due to, for example, a breakdown or a malfunction of the terminal and an attack by a malicious user terminal can be prevented.

Furthermore, although the first pairing value is generated by the pairing server 313 in Embodiments 1 to 3 described above, the first pairing value may be generated by the receiving terminal 307. In this case, the receiving terminal 307 may transmit the generated first pairing value to the pairing server 313. Likewise, although the second pairing value is generated by the pairing server 313, the second pairing value may be generated by the transmitting terminal 301. In this case, the transmitting terminal 301 may transmit the second pairing value to the pairing server 313. By so doing, the load on the pairing server 313 to generate a pairing value can be reduced.

Figure 52:
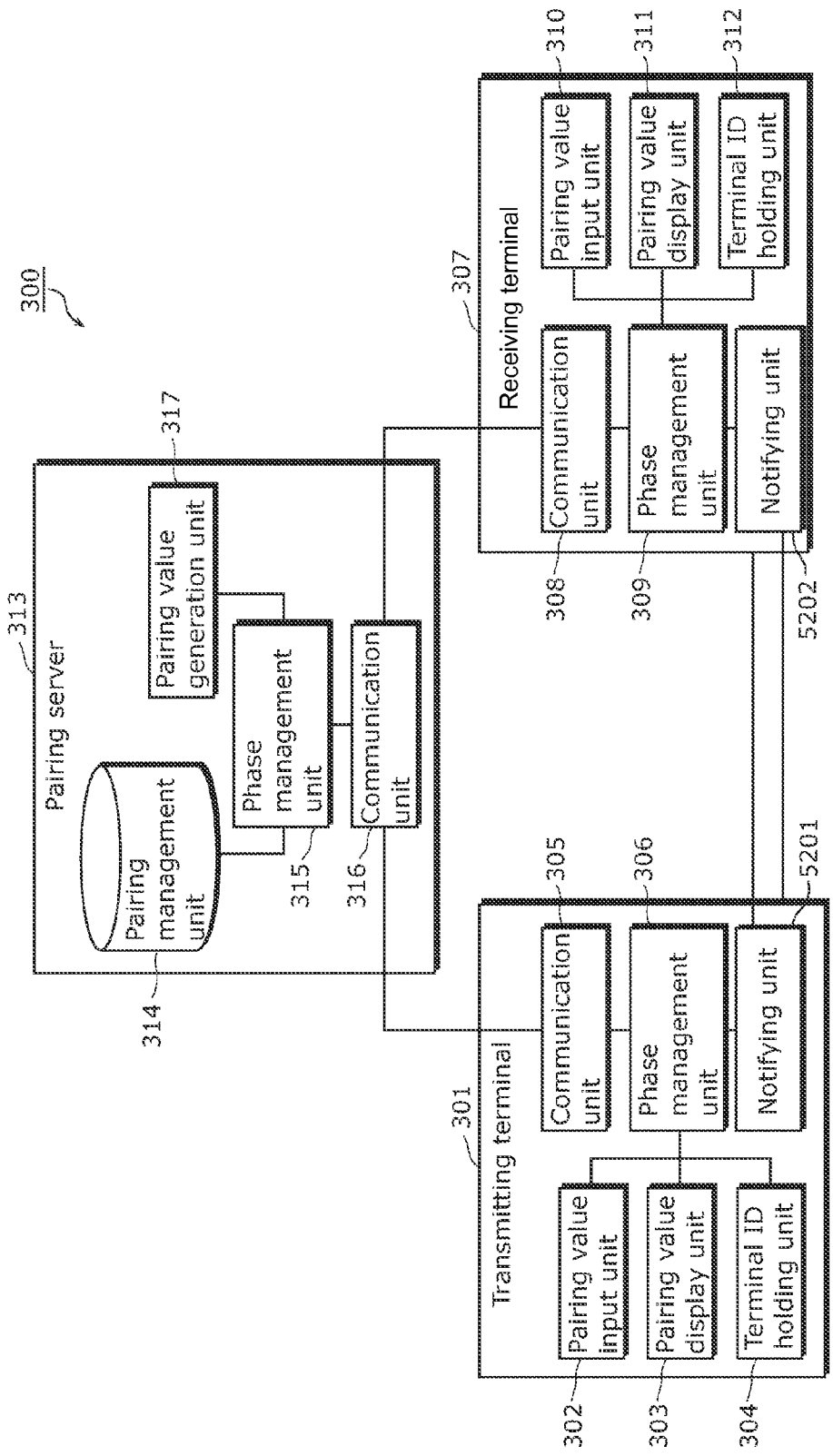
FIG. 52 is a block diagram showing a configuration of a communication control system in Variation of the present invention.

Furthermore, in Embodiments 1 to 3 described above, when notifying the transmitting terminal 301 and the receiving terminal 307 of the first pairing value and the second pairing value, the sender and the recipient intervene to make the notification of the first pairing value and the second pairing value. However, as shown in FIG. 52, the transmitting terminal 301 may include a notifying unit 5201 which automatically notifies the receiving terminal 307 of the pairing value by, for example, e-mail. Furthermore, the receiving terminal 307 may include a notifying unit 5202 which automatically notifies the transmitting terminal 301 of the pairing value by, for example, e-mail. In this case, the pairing value input unit 302 of the transmitting terminal 301 and the pairing value input unit 310 of the receiving terminal 307 may receive an input of the first or the second pairing value given by the notifying unit 5201 or 5202. Likewise, the pairing value display unit 303 of the transmitting terminal 301 and the pairing value display unit 311 of the receiving terminal 307 are not required to display the first pairing value or the second pairing value as shown in FIG. 13 or FIG. 22. By so doing, there is no need for a sender and a recipient to make notification of the first pairing value and the second pairing value, with the result that erroneous notification of the first pairing value and the second pairing value by a sender or a recipient can be prevented. In addition, there is also no need for a sender or a recipient to enter the pairing value, with the result that the erroneous input of the first pairing value and the second pairing value can be prevented. It also becomes possible to save power for input and output of the pairing value and to prevent mistakes in the pairing procedure.

Furthermore, part or all of the constituents of the pairing server 313, the transmitting terminal 301, or the receiving terminal 307 in Embodiments 1 to 3 described above may be provided in one system large scale integration (LSI). For example, in the pairing server 313, the phase management unit 315 and the pairing value generation unit 317 may be provided in the system LSI.

The system LSI is a super multifunctional LSI manufactured by integrating plural components into one chip and is specifically a computer system which includes a microprocessor, a read only memory (ROM), a random access memory (RAM) and so on. On the RAM, a computer program has been stored. When the microprocessor operates according to the computer program, the system LSI implements its functions.

The name used here is system LSI, but it may also be called IC, LSI, super LSI, or ultra LSI depending on the degree of integration. Moreover, ways to achieve integration are not limited to the LSI, and a dedicated circuit or a general purpose processor can also achieve the integration. A field programmable gate array (FPGA) that can be programmed after manufacturing LSIs or a reconfigurable processor that allows re-configuration of the connection or setting of a circuit cell within an LSI can be used.

In the future, with advancement in semiconductor technology, a brand-new or derivative technology may replace LSI and using such technology, the functional blocks can be integrated. This includes, as a possibility, an application of biotechnology.

Furthermore, the present invention can be implemented not only as the pairing server 313, the transmitting terminal 301, or the receiving terminal 307 which includes such characteristic processing units, but also as a communication control method which includes, as steps, the characteristic processing units included in the pairing server 313, the transmitting terminal 301, or the receiving terminal 307. Furthermore, the present invention can also be implemented as a computer program which causes a computer to execute the characteristic steps included in the communication control method. In addition, it goes without saying that such computer program may be distributed via a computer-readable non-transitory recording medium such as compact disc read only memory (CD-ROM) or a communication network such as the Internet.

INDUSTRIAL APPLICABILITY

The communication control system according to an implementation of the present invention is useful as a content sharing system in which content such as photos and video can be shared by acquaintances.

REFERENCE SIGNS LIST

100 Photo sharing system
101 Transmitting terminal
102 Receiving terminal
103 Photo sharing server
300 Communication control system
301 Transmitting terminal
302, 310 Pairing value input unit
303, 311 Pairing value display unit
304, 312 Terminal ID holding unit
304, 308, 316 Communication unit
306, 309 Phase management unit
307 Receiving terminal
313 Pairing server
314 Pairing management unit
314a Pairing management table
315 Phase management unit
315a First storing unit
315b Second storing unit
315c First determination unit
315d Second determination unit
315e Pairing unit
316a First transmitting unit
316b Second transmitting unit
317 Pairing value generation unit
317a First generation unit
317b Second generation unit
3801 User level input unit
5201, 5202 Notifying unit

The invention claimed is:

1. A communication control system for pairing a first communication device and a second communication device to control communication between said first communication device and said second communication device, said communication control system comprising:

said first communication device;
said second communication device; and
a server device connected to said first communication device and said second communication device,
wherein said server device includes:
a first generation unit configured to generate a first pairing identifier when said server device receives from said first communication device a first request which requests generation of the first pairing identifier;
a first transmitting unit configured to transmit the first pairing identifier generated by said first generation unit, to said first communication device in response to the first request;
a second generation unit configured to generate a second pairing identifier when said server device receives from said second communication device a second request which requests generation of the second pairing identifier;
a second transmitting unit configured to transmit the second pairing identifier generated by said second generation unit, to said second communication device in response to the second request; and
a pairing unit configured to pair said first communication device and said second communication device when said server device receives from said first communication device a third request which requests pairing of said first communication device and said second communication device,
said first communication device includes:
a first obtainment unit configured to obtain a second pairing identifier; and
a first communication unit configured to transmit the first request to said server device, receive the first pairing identifier generated by said first generation unit, from said server device in response to the first request, and transmit the third request to said server device,
said second communication device includes:
a second obtainment unit configured to obtain a first pairing identifier; and
a second communication unit configured to transmit the second request to said server device, and receive the second pairing identifier generated by said second generation unit, from said server device in response to the second request,
the second request includes the first pairing identifier obtained by said second obtainment unit,
the third request includes the first pairing identifier received by said first communication unit and the second pairing identifier obtained by said first obtainment unit,
said second generation unit is configured to generate the second pairing identifier when the first pairing identifier included in the second request matches the first pairing identifier generated by said first generation unit, and
said pairing unit is configured to pair said first communication device and said second communication device when the first pairing identifier and the second pairing identifier included in the third request match the first pairing identifier generated by said first generation unit and the second pairing identifier generated by said second generation unit.

2. The communication control system according to claim 1,
wherein said server device further includes:
a first storing unit configured to store the first pairing identifier generated by said first generation unit, into a storage unit configured to store the first pairing identifier and the second pairing identifier;

a second storing unit configured to store the second pairing identifier generated by said second generation unit, into said storage unit in such a way that the second pairing identifier is associated with the first pairing identifier generated by said first generation unit; and a first determination unit configured to determine, when said server device receives the second request, whether or not the second pairing identifier has been stored in said storage unit in such a way that the second pairing identifier is associated with the first pairing identifier included in the second request, and said second generation unit is configured to generate the second pairing identifier when said first determination unit determines that the second pairing identifier has not been stored in said storage unit.

3. The communication control system according to claim 1, wherein said server device further includes a second determination unit configured to determine whether or not a source of the third request is said first communication device, and said pairing unit is configured to pair said first communication device and said second communication device when said second determination unit determines that the source of the third request is said first communication device.

4. The communication control system according to claim 1, wherein said first communication device further includes a display unit configured to display the first pairing identifier received by said first communication unit, said first obtainment unit is an input unit configured to receive an input of the second pairing identifier from a user, and said first communication unit is configured to transmit to said server device the third request which includes the first pairing identifier displayed by said display unit and the second pairing identifier received by said input unit.

5. The communication control system according to claim 1, wherein said first communication device includes a first notifying unit configured to notify said second communication device of the first pairing identifier received by said first communication unit, and said second communication device includes a second notifying unit configured to notify said first communication device of the second pairing identifier received by said second communication unit.

6. The communication control system according to claim 1, wherein the first request includes level information indicating a level of an operation skill of a user who operates said first communication device, and said second generation unit is configured to generate the second pairing identifier such that a degree of complexity of the second pairing identifier decreases as the level indicated by the level information decreases.

7. The communication control system according to claim 6, wherein said first generation unit is configured to generate the first pairing identifier such that a degree of complexity of the first pairing identifier increases as the level indicated by the level information decreases.

8. A communication control system for pairing a first communication device and a second communication device to control communication between said first communication device and said second communication device, said communication control system comprising:

said first communication device;

said second communication device; and a server device connected to said first communication device and said second communication device, wherein said server device includes:

a first generation unit configured to generate a first pairing identifier when said server device receives from said first communication device a first request which requests generation of the first pairing identifier;

a first transmitting unit configured to transmit the first pairing identifier generated by said first generation unit, to said first communication device in response to the first request;

a second generation unit configured to generate a second pairing identifier when said server device receives from said second communication device a second request which requests generation of the second pairing identifier;

a second transmitting unit configured to transmit the second pairing identifier generated by said second generation unit, to said first communication device in response to the second request; and a pairing unit configured to pair said first communication device and said second communication device when said server device receives from said second communication device a third request which requests pairing of said first communication device and said second communication device, said first communication device includes a first communication unit configured to transmit the first request to said server device, and receive from said server device the first pairing identifier generated by said first generation unit and the second pairing identifier generated by said second generation unit, said second communication device includes:

an obtainment unit configured to obtain a first pairing identifier and a second pairing identifier; and a second communication unit configured to transmit the second request and the third request to said server device, the second request includes the first pairing identifier obtained by said obtainment unit, the third request includes the first pairing identifier and the second pairing identifier obtained by said obtainment unit, said second generation unit is configured to generate the second pairing identifier when the first pairing identifier included in the second request matches the first pairing identifier generated by said first generation unit, and said pairing unit is configured to pair said first communication device and said second communication device when the first pairing identifier and the second pairing identifier included in the third request match the first pairing identifier generated by said first generation unit and the second pairing identifier generated by said second generation unit.

9. The communication control system according to claim 8, wherein said server device further includes a second determination unit configured to determine whether or not a source of the third request is said second communication device, and said pairing unit is configured to pair said first communication device and said second communication device when said second determination unit determines that the source of the third request is said second communication device.

10. The communication control system according to claim 8,
wherein said second communication device further includes a second management unit configured to (i) determine, before said second communication unit transmits the third request to said server device, whether or not said second communication unit has already transmitted to said server device the second request which includes the first pairing identifier included in the third request, and (ii) prohibit, when said second communication unit has not yet transmitted the second request to said server device, said second communication unit from transmitting the third request to said server device.

11. The communication control system according to claim 10,
wherein said obtainment unit is an input unit configured to receive an input of the first pairing identifier and an input of the second pairing identifier from a user.

12. The communication control system according to claim 8,
wherein said first communication device further includes a notifying unit configured to notify said second communication device of the first and the second pairing identifiers received by said first communication unit.

13. A server device connected to a first communication device and a second communication device, for pairing the first communication device and the second communication device to control communication between the first communication device and the second communication device, said server device comprising:
a first generation unit configured to generate a first pairing identifier when said server device receives from the first communication device a first request which requests generation of the first pairing identifier;
a first transmitting unit configured to transmit the first pairing identifier generated by said first generation unit, to the first communication device in response to the first request;
a second generation unit configured to generate a second pairing identifier when said server device receives from the second communication device a second request which requests generation of the second pairing identifier;
a second transmitting unit configured to transmit the second pairing identifier generated by said second generation unit, to the second communication device in response to the second request; and
a pairing unit configured to pair the first communication device and the second communication device when said server device receives from the first communication device a third request which requests pairing of the first communication device and the second communication device,
wherein the second request includes a first pairing identifier obtained by the second communication device,
the third request includes the first pairing identifier transmitted to the first communication device and a second pairing identifier obtained by the first communication device,
said second generation unit is configured to generate the second pairing identifier when the first pairing identifier included in the second request matches the first pairing identifier generated by said first generation unit, and said pairing unit is configured to pair said first communication device and said second communication device when the first pairing identifier and the second pairing identifier included in the third request match the first pairing identifier generated by said first generation unit and the second pairing identifier generated by said second generation unit.

14. A communication device which is paired with another communication device by a server device, said communication device comprising:
an obtainment unit configured to obtain a first pairing identifier;
a communication unit configured to (i) transmit to the server device a second request which requests generation of a second pairing identifier and includes the first pairing identifier obtained by said obtainment unit, and (ii) transmit to the server device a third request which requests pairing of said communication device and the other communication device; and
a management unit configured to (i) determine, before said communication unit transmits the third request to the server device, whether or not said communication unit has transmitted the second request to the server device, and (ii) prohibit, when said communication unit has not transmitted the second request to the server device, said communication unit from transmitting the third request to the server device,
wherein the server device transmits a second pairing identifier to the other communication device when the first pairing identifier included in the second request matches a first pairing identifier transmitted from the server device to the other communication device,
said obtainment unit is configured to obtain the second pairing identifier,
the third request includes the first pairing identifier and the second pairing identifier obtained by said obtainment unit, and
said communication device and the other communication device are paired when the first pairing identifier and the second pairing identifier included in the third request match the first pairing identifier and the second pairing identifier transmitted from the server device to the other communication device.

15. A communication control method by which a server device connected to a first communication device and a second communication device pairs the first communication device and the second communication device to control communication between the first communication device and the second communication device, said communication control method comprising:
generating a first pairing identifier when the server device receives from the first communication device a first request which requests generation of the first pairing identifier;
transmitting the first pairing identifier generated in said generating of a first pairing identifier, to the first communication device in response to the first request;
generating a second pairing identifier when the server device receives from the second communication device a second request which requests generation of the second pairing identifier;
transmitting the second pairing identifier generated in said generating of a second pairing identifier, to the second communication device in response to the second request; and
pairing the first communication device and the second communication device when the server device receives from the first communication device a third request which requests pairing of the first communication device and the second communication device, wherein the second request includes a first pairing identifier obtained by the second communication device, in said generating of a second pairing identifier, the second pairing identifier is generated when the first pairing identifier included in the second request matches the first pairing identifier generated in said generating of a first pairing identifier, the third request includes the first pairing identifier transmitted to the first communication device and a second pairing identifier obtained by the first communication device, and in said pairing, the first communication device and the second communication device are paired when the first pairing identifier and the second pairing identifier included in the third request match the first pairing identifier generated in said generating of a first pairing identifier and the second pairing identifier generated in said generating of a second pairing identifier.

* * * * *